US012770090B2

(12) United States Patent
Weinkam et al.

(10) Patent No.: US 12,770,090 B2
(45) Date of Patent: Oct. 20, 2026

(54) AI-INTEGRATED LOGISTIC SYSTEMS AND METHODS

(71) Applicant: RunBuggy OMI, Inc., Ontario, CA (US)

(72) Inventors: Patrick Weinkam, San Francisco, CA (US); Chris Wang, Newark, CA (US); Pat Blachly, San Francisco, CA (US); David Erickson, San Francisco, CA (US); Raymond Chen, San Francisco, CA (US)

(73) Assignee: RunBuggy OMI, Inc., Ontario, CA (US)

( * ) Notice: Subject to any disclaimer, the term of this patent is extended or adjusted under 35 U.S.C. 154(b) by 0 days.

(21) Appl. No.: 18/951,199

(22) Filed: Nov. 18, 2024

(65) Prior Publication Data

US 2026/0141336 A1 May 21, 2026

Related U.S. Application Data

(60) Provisional application No. 63/600,489, filed on Nov. 17, 2023.

(51) Int. Cl.
*G06Q 10/083* (2024.01)
*G06F 16/9538* (2019.01)

(52) U.S. Cl.
CPC ....... *G06Q 10/083* (2013.01); *G06F 16/9538* (2019.01)

(58) Field of Classification Search
CPC .................................................. G06F 16/9538
See application file for complete search history.

(56) References Cited

U.S. PATENT DOCUMENTS

2011/0055191 A1* 3/2011 Bain .................. G06F 16/3338 707/706
2012/0239764 A1* 9/2012 Galbreath ........... G06F 16/9535 709/204
2017/0337648 A1* 11/2017 Berg ..................... G06F 16/951
2022/0043976 A1* 2/2022 Picinini ............... G06F 16/9538
2024/0202539 A1* 6/2024 Poirier .................. G06F 16/338

* cited by examiner

*Primary Examiner* — George Chen
*Assistant Examiner* — Duane N. Moore
(74) *Attorney, Agent, or Firm* — Quarles & Brady LLP

(57) ABSTRACT

Systems and methods for a transportation management system provide for: generating a user interface to receive a user query related to vehicle transportation; utilizing an artificial intelligence (AI) system to pre-process the user query to generate a preprocessed user query; accessing, based on the preprocessed user query, transportation data relevant to answering the user query; determining an automated answer to the user query based on the transportation data; transforming the automated answer into a response to the user query; and updating the user interface to include the response to the user query.

19 Claims, 17 Drawing Sheets

1100

| Transportation Order | Second of Message | Message Created By | Message | |
|---|---|---|---|---|
| T-342619730 | 4/20/2024 5:31:45 AM | TMSUser1@TMSDomain.com | Rerout T-342619730 | Abc |
| | | system | Order is in transit. Driver picked up vehicle at 2024-04-09 12:55. Dropoff ETA window is 2024-04-20 04:00 to 2024-04-20 15:00 | Abc |
| | 4/18/2024 4:41:52 PM | TMSUser1@TMSDomain.com | 4/15 - Reroute order T-349794232 - Do not close this one till delivery. | Abc |
| | 4/15/2024 2:13:05 PM | TMSUser1@TMSDomain.com | 4/15 - Reroute order T-349794232 - Do not close this one till delivery. | Abc |
| | 4/14/2024 3:00:01 PM | system | The drop-off window for Order has passed with no update. | Abc |
| | 4/13/2024 1:44:38 PM | unknown | order update: vin: undefined. <<address>> | Abc |
| | | | order update: vin: undefined. <<address>> | Abc |
| | | | order update: vin: undefined. Personal | Abc |
| | | | order update: vin: undefined. True | Abc |
| | 4/13/2024 12:02:12 PM | TMSUser1@TMSDomain.com | 4/13 - $2,474.29 Original Fare (MT) $2059.97 New Fare (WA) Origin Payout (MT) : $1,805.76 New Payout : $1,531.39 TMSUser1 < 1 minute ago @John Doe @Jane Doe They did indeed call back ...they.. | Abc |
| | 4/13/2024 11:54:15 AM | unknown | order update: vin: undefined. <<address>> | Abc |
| | | | order update: vin: undefined. 914-589 | Abc |
| | | | order update: vin: undefined. BUSINESS | Abc |
| | | | order update: vin: undefined. Transportation Company Inc | Abc |
| | | | order update: vin: undefined. True | Abc |
| | 4/13/2024 10:22:31 AM | TMSUser1@TMSDomain.com | 4/12 PL what we have so far: The address on file is the title address no the shipping address It was portal verified and when I did speak to the Buyer he assumed hte address was correct because of Drive Caramel c.. | Abc |
| | 4/13/2024 10:17:04 AM | TMSUser1@TMSDomain.com | 4/12 PL what we have so far: The address on file is the title address no the shipping address It was portal verified and when I did speak to the Buyer he assumed hte address was correct because of Drive Caramel c.. | Abc |
| | 4/13/2024 9:48:28 AM | Shipper1@shipdomain.com | call me asap | Abc |
| | 4/13/2024 9:48:24 AM | Shipper2@shipdomain.com | what we need to do | Abc |
| | 4/13/2024 9:48:18 AM | Shipper3@shipdomain.com | Car going to Ny not to Mt and driver is 20 min away | Abc |
| | 4/13/2024 9:44:25 AM | Shipper3@shipdomain.com | 4/13 - TRANSPORT COMPANY LLC - Buyer called and advised driver is deliverying to the address on file today, however, he states he notified Caramel that is address is <<address>> | Abc |
| | 4/13/2024 9:31:56 AM | Shipper1@shipdomain.com | Hello Megan call me APSP Dan (###) ###-#### | Abc |
| | 4/10/2024 9:49:03 AM | TMSUser1@TMSDomain.com | 4/10 - TRANSPORT COMPANY LLC - - Daniel (###)###-#### transportation company (TRANSPORT COMPANY LLC) driver // In Transit \| estimated time of arrival drop-off 4/14 - confirm extimat... | Abc |

FIG. 11

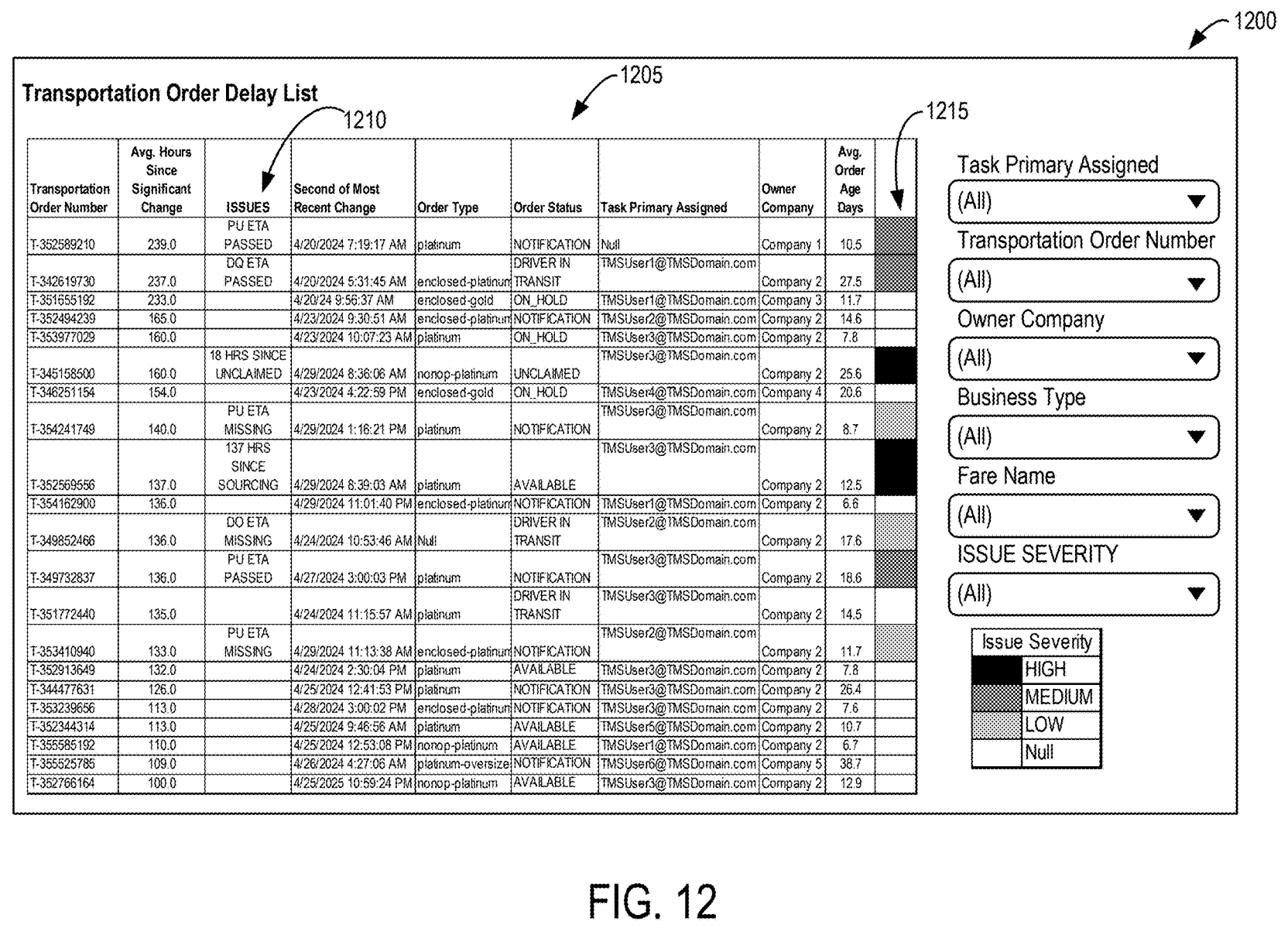

1200

Transportation Order Delay List

1205 1210 1215

| Transportation Order Number | Avg. Hours Since Significant Change | ISSUES | Second of Most Recent Change | Order Type | Order Status | Task Primary Assigned | Owner Company | Avg. Order Age Days |
|---|---|---|---|---|---|---|---|---|
| T-352589210 | 239.0 | PU ETA PASSED | 4/20/2024 7:19:17 AM | platinum | NOTIFICATION | Null | Company 1 | 10.5 |
| T-342619730 | 237.0 | DO ETA PASSED | 4/20/2024 5:31:45 AM | enclosed-platinum | DRIVER IN TRANSIT | TMSUser1@TMSDomain.com | Company 2 | 27.5 |
| T-351655192 | 233.0 | | 4/20/24 9:56:37 AM | enclosed-gold | ON_HOLD | TMSUser1@TMSDomain.com | Company 3 | 11.7 |
| T-352494239 | 165.0 | | 4/23/2024 9:30:51 AM | enclosed-platinum | NOTIFICATION | TMSUser2@TMSDomain.com | Company 2 | 14.6 |
| T-353977029 | 160.0 | | 4/23/2024 10:07:23 AM | platinum | ON_HOLD | TMSUser3@TMSDomain.com | Company 2 | 7.8 |
| T-345158500 | 160.0 | 18 HRS SINCE UNCLAIMED | 4/29/2024 8:36:06 AM | nonop-platinum | UNCLAIMED | TMSUser3@TMSDomain.com | Company 2 | 25.6 |
| T-346251154 | 154.0 | | 4/23/2024 4:22:59 PM | enclosed-gold | ON_HOLD | TMSUser4@TMSDomain.com | Company 4 | 20.6 |
| T-354241749 | 140.0 | PU ETA MISSING | 4/29/2024 1:16:21 PM | platinum | NOTIFICATION | TMSUser3@TMSDomain.com | Company 2 | 8.7 |
| T-352569556 | 137.0 | 137 HRS SINCE SOURCING | 4/29/2024 8:39:03 AM | platinum | AVAILABLE | TMSUser3@TMSDomain.com | Company 2 | 12.5 |
| T-354162900 | 136.0 | | 4/29/2024 11:01:40 PM | enclosed-platinum | NOTIFICATION | TMSUser1@TMSDomain.com | Company 2 | 6.6 |
| T-349852466 | 136.0 | DO ETA MISSING | 4/24/2024 10:53:46 AM | Null | DRIVER IN TRANSIT | TMSUser2@TMSDomain.com | Company 2 | 17.6 |
| T-349732837 | 136.0 | PU ETA PASSED | 4/27/2024 3:00:03 PM | platinum | NOTIFICATION | TMSUser3@TMSDomain.com | Company 2 | 18.6 |
| T-351772440 | 135.0 | | 4/24/2024 11:15:57 AM | platinum | DRIVER IN TRANSIT | TMSUser3@TMSDomain.com | Company 2 | 14.5 |
| T-353410940 | 133.0 | PU ETA MISSING | 4/29/2024 11:13:38 AM | enclosed-platinum | NOTIFICATION | TMSUser2@TMSDomain.com | Company 2 | 11.7 |
| T-352913649 | 132.0 | | 4/24/2024 2:30:04 PM | platinum | AVAILABLE | TMSUser3@TMSDomain.com | Company 2 | 7.8 |
| T-344477631 | 126.0 | | 4/25/2024 12:41:53 PM | platinum | NOTIFICATION | TMSUser3@TMSDomain.com | Company 2 | 26.4 |
| T-353239656 | 113.0 | | 4/28/2024 3:00:02 PM | enclosed-platinum | NOTIFICATION | TMSUser3@TMSDomain.com | Company 2 | 7.6 |
| T-352344314 | 113.0 | | 4/25/2024 9:46:56 AM | platinum | AVAILABLE | TMSUser5@TMSDomain.com | Company 2 | 10.7 |
| T-355585192 | 110.0 | | 4/25/2024 12:53:08 PM | nonop-platinum | AVAILABLE | TMSUser1@TMSDomain.com | Company 2 | 6.7 |
| T-355525785 | 109.0 | | 4/26/2024 4:27:06 AM | platinum-oversize | NOTIFICATION | TMSUser6@TMSDomain.com | Company 5 | 38.7 |
| T-352766164 | 100.0 | | 4/25/2025 10:59:24 PM | nonop-platinum | AVAILABLE | TMSUser3@TMSDomain.com | Company 2 | 12.9 |

Task Primary Assigned
(All)

Transportation Order Number
(All)

Owner Company
(All)

Business Type
(All)

Fare Name
(All)

ISSUE SEVERITY
(All)

| Issue Severity |
|---|
| HIGH |
| MEDIUM |
| LOW |
| Null |

FIG. 12

1500

1505

Jane Doe *Today at 8:59 AM*

@RunBot *Please source T-448873823*

4 Replies

1510

RunBot (APP) *Today at 8:59 AM*

*Hello I am RunBot, your friendly AI assistant!*
*Thanks for your request, I'm on it!*

*Sourcing results for T-448873823 are shown as a summary below.*
*For complete results, click here:* Sourcing
*For backhaul, click here:* Backhaul

RunBot (APP) *Today at 9:00 AM*

| Transporter | Phone | Route | Truck | App Use | Note | Concerns |
|---|---|---|---|---|---|---|
| Transporter 1 | (###) ###-#### | GOOD | GOOD | GREAT | TP < 200.0 miles of PU. Stellor app usage. | |
| Transporter 2 | (###) ###-#### | GOOD | GREAT | POOR | TP scheduled < 200.0 miloes of PU | ETA is met for less than 50% of orders. TP unclaims 30.0% of |
| Transporter 3 | (###) ###-#### | GOOD | GREAT | POOR | | |
| Transporter 4 | (###) ###-#### | OK | GREAT | GREAT | Stellar app usage. | |
| Transporter 5 | (###) ###-#### | OK | GREAT | POOR | | TP unclaims 35.0% of orders |
| Transporter 6 | (###) ###-#### | GOOD | GOOD | GOOD | | |
| Transporter 7 | (###) ###-#### | GOOD | GOOD | OK | TP< 200.0 miles of PU | TP unclaims 31/0% of orders |
| Transporter 8 | (###) ###-#### | GOOD | GREAT | OK | | |
| Transporter 9 | (###) ###-#### | OK | GREAT | POOR | | ETA is met for less than 50% of orders. TP unclaims 24.0% of orders. TP holds |
| Transporter 10 | (###) ###-#### | GOOD | | | TP scheduled < 200.0 miloes | |

FIG. 15

AI-INTEGRATED LOGISTIC SYSTEMS AND METHODS

CROSS-REFERENCE TO RELATED APPLICATIONS

This application claims priority to U.S. Provisional Application No. 63/600,489, filed on Nov. 17, 2023, titled "AI-INTEGRATED LOGISTIC SYSTEMS AND METHODS," which is hereby incorporated by reference in its entirety.

SUMMARY

Various aspects of the present disclosure relate to artificial intelligence (AI) integrated logistics systems and methods for implementation within a transportation management system.

The disclosed technology relates to systems and methods for an electronic transportation management system (TMS). Some embodiments of the disclosure provide an electronic transportation management system. The system may include a processing system comprising one or more electronic processors. The processing system may be configured to generate a first user interface to receive a vehicle transportation order for a vehicle to be transported. The processing system may be configured to receive, via the first user interface, the vehicle transportation order, where the vehicle transportation order indicates a destination, a starting location, and a vehicle characteristic of the vehicle to be transported. The processing system may be configured to provide the vehicle transportation order to a first machine learning model to generate a priority ranking for the vehicle transportation order. The processing system may be configured to receive, from the first machine learning model, the priority ranking for the vehicle transportation order. The processing system may be configured to execute an automated action responsive to the priority ranking.

Other embodiments of the disclosure provide a method of controlling automated transportation order generation and sourcing. The method may include generating, with a processing system comprising one or more electronic processors, a first user interface to receive a vehicle transportation order for a vehicle to be transported. The method may include receiving, with the processing system, the vehicle transportation order, where the vehicle transportation order indicates a destination, a starting location, and a vehicle characteristic of the vehicle to be transported. The method may include providing, with the processing system, the order to a first machine learning model configured to generate a priority ranking for the vehicle transportation order. The method may include receiving, with the processing system, from the first machine learning model, the priority ranking for the vehicle transportation order. The method may include providing, with the processing system, based on the priority ranking, the vehicle transportation order to a second machine learning model configured to generate a list ranking a plurality of transport entities. The method may include receiving, with the processing system, from the second machine learning model, the list ranking the plurality of transport entities. The method may include executing, with the processing system, an automated action based on the list ranking the plurality of transport entities.

Other embodiments of the disclosure provide a non-transitory computer-readable medium storing instructions that, when executed by one or more electronic processors of a processing system, cause the processing system to perform operations comprising: generating a first user interface to receive a vehicle transportation order for a vehicle to be transported; receiving the vehicle transportation order, where the vehicle transportation order indicates a destination, a starting location, and a vehicle characteristic of the vehicle to be transported; providing the order to a first machine learning model configured to generate a priority ranking for the vehicle transportation order; receiving, from the first machine learning model, the priority ranking for the vehicle transportation order; providing, based on the priority ranking, the vehicle transportation order to a second machine learning model configured to generate a list ranking a plurality of transport entities; receiving, from the second machine learning model, the list ranking the plurality of transport entities; and executing an automated action based on the list ranking the plurality of transport entities.

Other embodiments of the disclosure provide an electronic transportation management system. The system may include a processing system comprising one or more electronic processors. The processing system may be configured to generate a user interface to receive a user query related to vehicle transportation. The processing system may be configured to receive, via the user interface, the user query related to vehicle transportation. The processing system may be configured to provide the user query to an artificial intelligence (AI) system including one or more machine learning models, the AI system to pre-process the user query to generate a processed user query based on the user query. The processing system may be configured to provide the processed user query to the AI system, where the AI system is to access, based on the processed user query, transportation data from a database that stores information related to vehicle transportation. The processing system may be configured to receive, from the AI system, the transportation data. The processing system may be configured to provide the transportation data and the user query to the AI system, where the AI system is to determine an automated answer to the user query based on the transportation data. The processing system may be configured to receive, from the AI system, the automated answer to the user query. The processing system may be configured to transform the automated answer to the user query into a human readable format as a response to the user query. The processing system may be configured to update the user interface to include the response to the user query as an updated user interface. The processing system may be configured to transmit the updated user interface to a user device for display using the user interface.

Other embodiments of the disclosure provide a method to control artificial intelligence (AI) human-machine interaction within a transportation management system. The method may include generating, with a processing system comprising one or more electronic processors, a user interface to receive a user query related to vehicle transportation. The method may include receiving, with the processing system, via the user interface, the user query related to vehicle transportation. The method may include providing, with the processing system, the user query to an artificial intelligence (AI) system including one or more machine learning models, the AI system to pre-process the user query to transform the user query to a processed user query, where the processed user query is the user query augmented with a configuration file that is indicative of an intent of the user query and an entity of the user query. The method may include receiving, with the processing system, from the AI system, the processed user query. The method may include providing, with the processing system, the processed user query to the AI system, where the AI system is to access, based on the processed user query, transportation data from a database that stores information related to vehicle transportation, where the transportation data is related to the intent of the user query as indicated by the configuration file. The method may include receiving, with the processing system, from the AI system, the transportation data. The method may include providing, with the processing system, the transportation data and the user query to the AI system, where the AI system is to determine an automated answer to the user query based on the transportation data. The method may include receiving, with the processing system, from the AI system, the automated answer to the user query. The method may include transforming, with the processing system, the automated answer to the user query into a human readable format as a response to the user query. The method may include updating, with the processing system, the user interface to include the response to the user query as an updated user interface. The method may include transmitting, with the processing system, the updated user interface to a user device for display using the user interface.

Other embodiments of the disclosure provide a non-transitory computer-readable medium storing instructions that, when executed by one or more electronic processors of a processing system, cause the processing system to perform operations comprising: generating a user interface to receive a user query related to vehicle transportation; receiving, via the user interface, the user query related to vehicle transportation; providing the user query to an artificial intelligence (AI) system including one or more machine learning models, the AI system to generate an automated response to the user query based on transportation data that is accessible from a database and is relevant to answering the user query; updating the user interface to include a response to the user query the represents the automated response to the user query as determined by the AI system; and transmitting the updated user interface to a user device for display using the user interface.

BRIEF DESCRIPTION OF THE DRAWINGS

The following drawings are provided to help illustrate various features of examples of the disclosure and are not intended to limit the scope of the disclosure or exclude alternative implementations.

FIG. 11 is a screenshot of an example GUI that includes the status data for a vehicle transportation order in accordance with some configurations.

FIG. 12 is a screenshot of an example GUI including a vehicle transportation order delay list in accordance with some configurations.

FIG. 15 is a screenshot of a GUI including a user query involving execution of a code function in accordance with some configurations.

DETAILED DESCRIPTION

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways. The terminology in this document is used for the purpose of description and should not be regarded as limiting. Words such as "including," "comprising," and "having" and variations thereof as used herein are meant to encompass the items listed thereafter, equivalents thereof, as well as additional items.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more electronic processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

Figure 1:
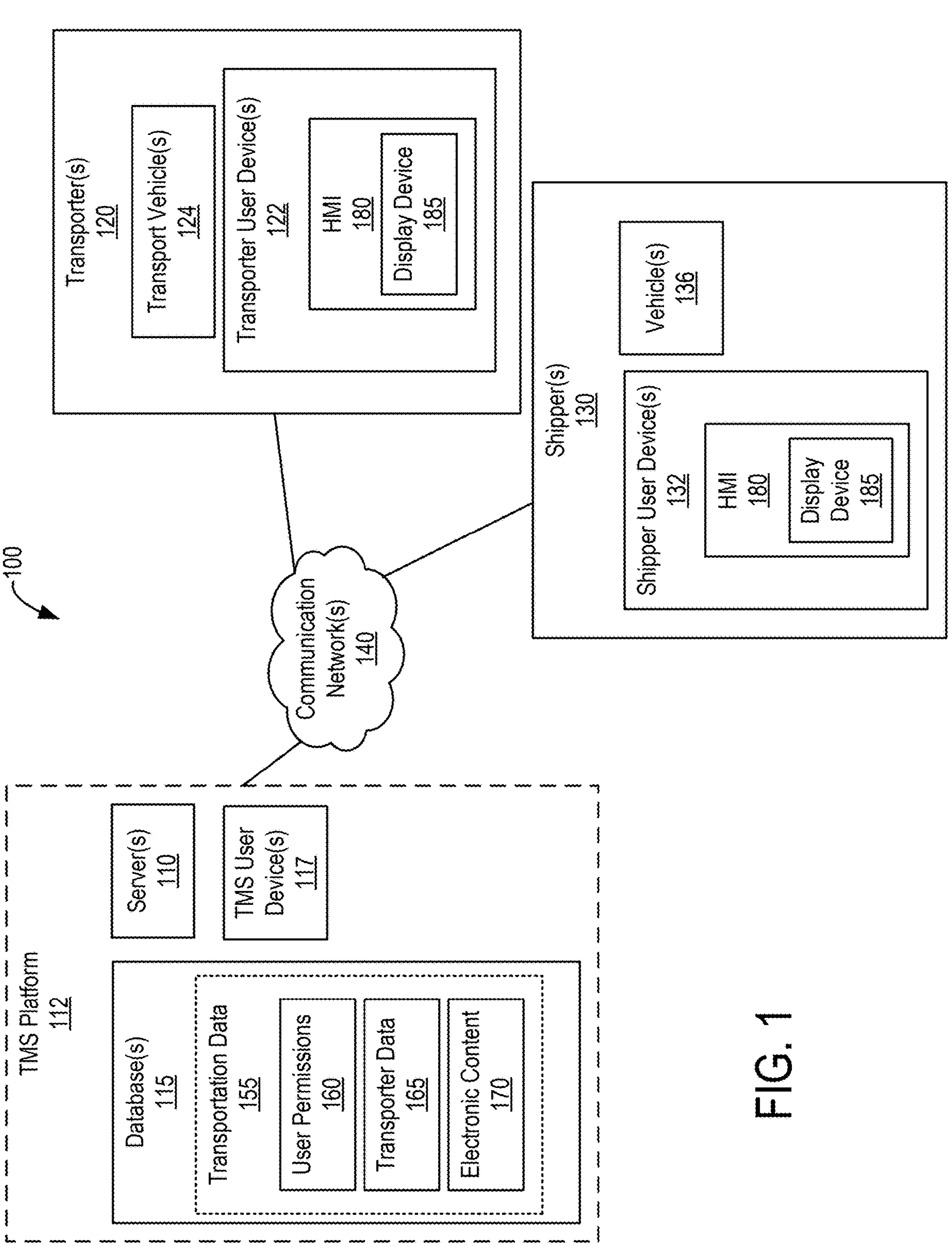
FIG. 1 illustrates a system level block diagram for providing a transportation management system (TMS) in accordance with some configurations.

FIG. 1 schematically illustrates a system 100 to provide a TMS having artificial intelligence (AI) integrated logistics and functionality in a distributed computing environment in accordance with some configurations. The system 100 includes a TMS platform 112. As illustrated in FIG. 1, the TMS platform 112 may include a server 110 implementing (or otherwise hosting) a TMS, one or more databases 115, and one or more TMS user devices 117, as described in greater detail herein. The system 100 may also include one or more transporters 120 and one or more shippers 130. As illustrated in FIG. 1, the transporter(s) 120 may be associated with one or more transporter user devices 122, one or more transport vehicles 124, or a combination thereof, as described in greater detail herein. The system 100 may also include one or more shippers 130. The shipper(s) 130 may be associated with one or more shipper user devices 132, one or more vehicles 136 (e.g., vehicles to be transported), or a combination thereof, as described in greater detail herein.

In some configurations, the system 100 includes fewer, additional, or different components than illustrated in FIG. 1. Also, in some configurations, the database(s) 115 may be included in the server 110, the TMS user device(s) 117, or a combination thereof and one or both of the database(s) 115 and the server 110 may be distributed among multiple databases or servers. Alternatively, or in addition, in some configurations, components of the system 100 may be combined into a single device (e.g., the database 115, the TMS user device(s) 177, and the server 110).

The TMS platform 112 (e.g., the server 110, the database(s) 115, and the TMS user device(s) 177), the transporter(s) 120 (e.g., the transporter user device(s) 122), and the shipper(s) 130 (e.g., the shipper user device(s) 132) communicate over one or more wired or wireless communication networks 140. Portions of the communication networks 140 may be implemented using a wide area network, such as the Internet, a local area network, such as Bluetooth™ network or Wi-Fi, and combinations or derivatives thereof. In some configurations, additional communication networks may be used to allow one or more components of the system 100 to communicate. Also, in some embodiments, components of the system 100 may communicate directly as compared to through a communication network 140 and, in some configurations, the components of the system 100 may communicate through one or more intermediary devices not illustrated in FIG. 1.

The server 110 can include one or more server(s) (e.g., one or more cloud servers, data servers, computing devices, computers, etc. and collectively referred to herein as "the server 110") and other components that may implement certain embodiments and features (e.g., the TMS or platform) described herein. Other devices, such as specialized sensor devices, etc., may interact with the server 110.

Figure 2:
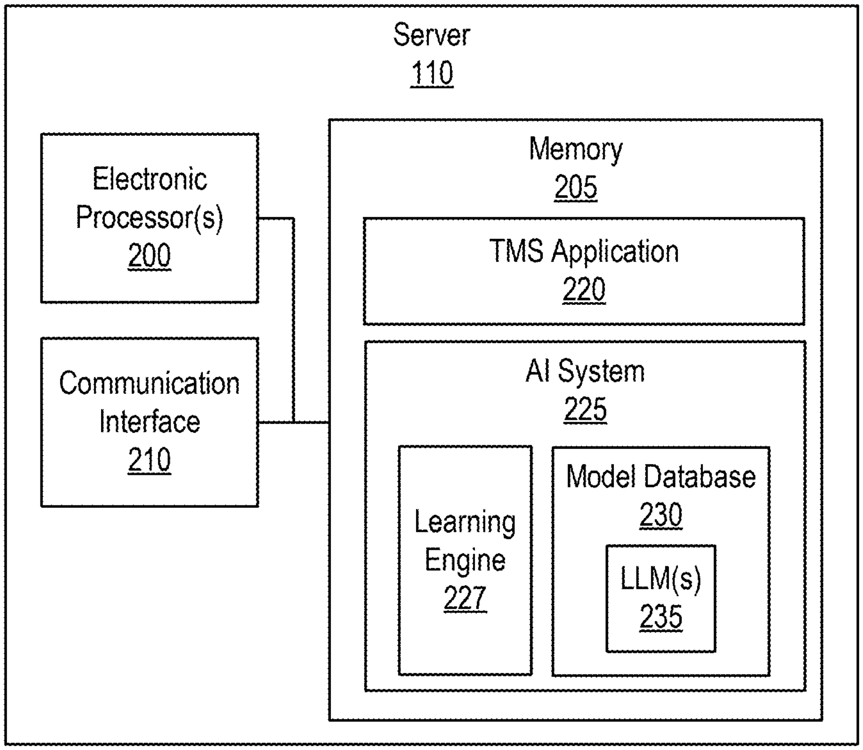
FIG. 2 illustrates a server included in the system of FIG. 1 in accordance with some configurations.

As illustrated in FIG. 2, the server 110 includes one or more electronic processors 200 (collectively referred to herein as "the electronic processor 200"), a memory 205, and a communication interface 210. The electronic processor 200, the memory 205, and the communication interface 210 communicate through wired connections or wirelessly, over one or more communication lines or buses, or a combination thereof. The server 110 may include additional, different, or fewer components than those illustrated in FIG. 2 in various configurations. For example, the server 110 may also include one or more human machine interfaces, such as a keyboard, keypad, mouse, joystick, touchscreen, display device, printer, microphone, neural link device (e.g., a neural implant device or integrated circuit (IC) configured to provide, e.g., a brain-computer interface), speaker, and the like, that receive input from a user, provide output to a user, or a combination thereof. The server 110 may also perform additional functionality other than the functionality described herein. Also, the functionality (or a portion thereof) described herein as being performed by the server 110 may be distributed among multiple servers or devices (for example, as part of a cloud service or cloud-computing environment), may be performed by one or more user devices (e.g., the TMS user device(s) 117, the transporter user device(s) 122, the shipper user device(s) 132, etc.), or a combination thereof.

The communication interface 210 allows the server 110 to communicate with devices external to the server 110. For example, as illustrated in FIG. 1, the server 110 may communicate with the database(s) 115, the TMS user device(s) 117, the transporter user device(s) 122, the shipper user device(s) 132, or a combination thereof through the communication interface 210. The communication interface 210 may include a port for receiving a wired connection to an external device (for example, a universal serial bus (USB) cable and the like), a transceiver for establishing a wireless connection to an external device (for example, over one or more communication networks 140, such as the Internet, local area network (LAN), a wide area network (WAN), and the like), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

As illustrated in FIG. 2, the memory 205 may include a TMS application 220 (referred to herein as "the application 220"). The application 220 is a software application executable by the electronic processor 200. As described in more detail herein, the electronic processor 200 executes the application 220 to perform one or more TMS processes or functionality. In some configurations, the application 220 (when executed by the electronic processor 200) may perform the TMS processes or functionality described in greater detail herein by interacting with (or otherwise implementing) functionality of an artificial intelligence (AI) system 225. As illustrated in FIG. 2, the AI system 225 may include a learning engine 227 and a model database 230.

In some configurations, the learning engine 227 develops one or more models using one or more machine learning functions. Machine learning functions are generally functions that allow a computer application to learn without being explicitly programmed. In particular, the learning engine 227 is configured to develop an algorithm or model based on training data. As one example, to perform supervised learning, the training data includes example inputs and corresponding desired (for example, actual) outputs, and the learning engine 227 progressively develops a model that maps inputs to the outputs included in the training data. As another example, to perform self-supervised learning (SSL), a model is trained on a task using the data itself to generate supervisory signals (e.g., unlabeled training data), rather than relying on, e.g., external labels provided by a user (e.g., labeled training data). As yet another example, to perform semi-supervised learning, the training data may include desired output values for a subset of the training data (e.g., labeled training data) while the remaining training data may be unlabeled or imprecisely labeled (e.g., unlabeled training data). Machine learning performed by the learning engine 227 may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms. These approaches allow the learning engine 227 to ingest, parse, and understand data and progressively refine models.

Models generated by the learning engine 227 can be stored in the model database 230. As illustrated in FIG. 2, the model database 230 may be included in the memory 205 of the server 110. It should be understood, however, that, in some configurations, the model database 230 may be included in one or more separate devices accessible by the server 110 of FIG. 1 (including a remote database, and the like).

As described in greater detail herein, in some configurations, the technology disclosed herein may utilize or implement one or more large language models (LLMs) as part of implementing the TMS processes and functionality described herein. Accordingly, in some configurations, the learning engine 227 may develop one or more LLMs 235. Generally, a LLM 235 may include a deep AI or machine learning model that can comprehend and generate human language text. For instance, a LLM 235 may be configured to determine meanings (or context) from a sequence of words and understand relationships between those words and, ultimately, perform a task based on that understanding. For instance, a LLM 235 may perform a variety of natural language processing (NLP) related tasks to produce content based on input prompts in human language. Such tasks may generally include answering questions (e.g., responding to a user query), translating text, text generation, content summary, sentiment analysis, etc.

The LLM(s) 235 may be an artificial neural network that is trained using self-supervised learning, semi-supervised learning, or a combination thereof. Accordingly, in some configurations, the learning engine 227 may develop artificial neural networks using self-supervised learning, semi-supervised learning, or a combination thereof. As illustrated in FIG. 2, the LLM(s) 235 may be stored in the model database 230 of the server 110. It should be understood, however, that, in some configurations, the LLM(s) 235 may be included in one or more separate devices accessible by the server 110 of FIG. 1 (including a remote database, and the like). In some configurations, the LLM(s) 235 may be trained (or retrained) using feedback data (as training data).

The memory 205 may include additional, different, or fewer components in different configurations. Alternatively, or in addition, in some configurations, one or more components of the memory 205 may be combined into a single component, distributed among multiple components, or the like. Alternatively, or in addition, in some configurations, one or more components of the memory 205 may be stored remotely from the server 110, or, in a remote database, another server, a remote user device, an external storage device, or the like (e.g., the database(s) 115, the TMS user device(s) 117, the transporter user device(s) 120, the shipper user device(s) 132, etc.).

Returning to FIG. 1, the TMS platform 112 may include the database(s) 115. The database(s) 115 can include any suitable storage device or devices that can be used to store suitable data. Although not illustrated in FIG. 1, the database(s) 115 may include similar components as the server 110, such as electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections, and one or more human machine interfaces.

As illustrated in FIG. 1, the database(s) 115 may store transportation data 155. The transportation data 155 may include data or information related to performing one or more TMS processes or functionality associated with the TMS platform 112. In some examples, the transportation data 155 may include load identifier(s), preorder(s), order(s), transport vehicle (or truck) information, driver information, internal transporter information, automation rule template(s), system integration template(s), etc., that can be used, e.g., by the server 110 to receive load identifier(s), provide internal transporter indication(s) and an open marketplace transporter indication, receive user input(s) to select a selected transporter indication, generate preorder(s), determine and provide group(s) based on load identifiers, generate order(s), output order(s) to internal transporter(s) or open marketplace system, determine partner transporter(s), display statuses of orders, obtain statuses of orders from the open marketplace system, generate transportation task(s), configure automation rule template(s), or configure system integration template(s).

In some configurations, the transportation data 155 may be a collection of data aggregated from a plurality of data sources, such as, e.g., the shipper user device(s) 132, the transporter user device(s) 122, another data source, etc. For example, the transportation data 155 may be compiled (or aggregated) from transportation transactions, user activity or interactions with the TMS platform 112, transport quotes, data sources external to the TMS platform 112 (e.g., external websites), external transporter data sources, communications within the TMS platform 112, navigation systems (e.g., location data, such as GPS data), data sources internal to the TMS platform 112, etc.

In some configurations, the transportation data 155 may include one or more user permissions 160 (collectively referred to herein as "the user permissions 160"). As used herein, a user permission 160 may define accessibility to data (e.g., TMS data) or content (e.g., electronic or digital content). In some examples, the user permission(s) 160 may specify what content a user may access or interact with (e.g., view, edit, download, etc.). In some configurations, the user permission(s) 160 may be based on a specific user (e.g., user-specific user permissions). For instance, a first user may have a first user permission while a second user may have a second user permission different from the first user permission. In some examples, the user permission(s) 160 may be based on a role or title of a user, a department or group of a user, etc. As one example, the transporter(s) 120 may have different user permissions 160 than the shipper(s) 130. As another example, users of the TMS user device(s) 117, such as, e.g., users or entities that manage or facilitate the TMS platform 112 (e.g., TMS administrators, managers, etc.), may have different user permissions 160 than the shipper(s) 130 and the transporter(s) 120.

In some configurations, the transportation data 155 may include transporter data 165. As described herein, the transporter(s) 120 may include, e.g., a driver, a company user, or a suitable person to perform vehicle transportation operations. In some examples, transporter data 165 may include information or data related to, e.g., a type of the transporter 120 (e.g., an inhouse transporter, a partner transporter, an open marketplace transporter, etc.), a name of the transporter 120; a type of the transport vehicle(s) 124 of the transporter 120 (e.g., a single-level trailer, a multi-level trailer, a single-car trailer, a multi-car trailer, an enclosed trailer, an open car trailer, a flatbed trailer, a freight truck, an auto carrier, a semi-trailer, an enclosed multi-level car carrier, etc.); a number of transport vehicle(s) 124 in fleet; an availability or status of the transport vehicle(s) 124; an availability or status of the transporter 120 (e.g., awaiting transport, active or in transit, inactive, down for maintenance, etc.); location related information (e.g., a location that the transporter 120 is based out of, a location of the transport vehicle(s) 124, a current location of the transport vehicle(s) 124 or the transporter 120, a future location of the transport vehicle(s) 124 or the transporter 120, etc.); contact information (e.g., an email address, a mailing address, a phone number, a fax number, etc.); a preference of the transporter 120 (e.g., whether the transporter 120 will deliver in urban or high density areas, etc.); a TMS account identifier of the transporter 120 (e.g., credentials for the TMS platform 112, such as an account number, a username, etc.); order related information for the transporter 120 (e.g., a number of completed orders, a number of pending orders, an order satisfaction rating or metric, etc.); usage data related to the TMS platform 112 (e.g., how frequently does the transporter 120 interact or use the TMS platform 112, how responsive is the transporter 120 to communications within the TMS platform 112, etc.); payout information (e.g., average payout per order, a minimum payout, a maximum payout, etc.); a statistic related to previous orders (e.g., a characteristic or parameter of previously transported vehicles, a list of shippers 130 that the transporter 120 has previously transported for, previous routes, previous destinations, a delayed delivery metric, etc.); experience of the transporter 120 (e.g., how long the transporter 120 has been transporting vehicles); a permission of the transporter, such as, e.g., a certificate, a permit, a registration, a credential, or a license of the transporter 120 (e.g., a USDOT number, a commercial driver's license, a proof of insurance, an oversized permit, an overweight permit, a state-specific permit, a heavy vehicle use permit, a state motor carrier permit or registration, etc.); etc.

In some configurations, the transportation data 155 may include electronic content 170. The electronic content 170 may include various media types or formats. For instance, the electronic content 170 may include videos, audios, images, documents, etc. As one example, the electronic content 170 may include electronic documents (also referred to herein as electronic files), including, e.g., a word processing file, a processing file, a spreadsheet file, a presentation file, an electronic correspondence (e.g., an email, a multimedia message, etc.), etc. As another example, the electronic content 170 may include audio files, including, e.g., an MP3 file, a WAV file, etc. As yet another example, the electronic content 170 may include video files, including, e.g., an MP4 file, a MOV file, etc. As yet another example, the electronic content 170 may include image files, including, e.g., a JPEG file, a TIFF file, a GIF, a PDF file, etc.

In some configurations, the electronic content 170 may include a collection of internal information or content of the TMS platform 112. In some examples, the electronic content 170 may provide instructions explaining a processes or functionality of the TMS platform 112. As one example, the electronic content 170 may include one or more user guides or manuals for performing various tasks or functions within the TMS platform 112, such as, e.g., a step-by-step guide, a slide deck, a how-to video, etc. The electronic content 170 may provide instruction regarding, e.g., how to create a new transportation order within the TMS platform 112, how to create an account with the TMS platform 112, how to cancel a transportation order, how to message a transporter or a shipper, etc.

In some configurations, the electronic content 170 may be included within a document management system (DMS). For example, in some instances, the electronic content 170 may be managed via a collaboration software or service. In some instances, the electronic content 170 is specifically curated or organized such that accuracy and performance of the technology disclosed herein may be improved. As one example value proposition, the electronic content 170 may be organized based on permissions (e.g., the user permissions 160), a context type (e.g., an internal context, an open marketplace context, etc.), whether the electronic content 170 is internal or external, etc. For instance, in some configurations, one or more portions of the electronic content 170 may be tagged (or otherwise classified) to indicate the permission(s), the context type, whether the portion is internal or external to the TMS platform 112, etc. (e.g., via metadata associated with the portion(s) of the electronic content 170). As one example, a document included within the electronic content 170 may be identified as being available to the shipper(s) 130 but not to the transporter(s) 120 (e.g., as the user permission(s) 160), related to an open marketplace context, and being internal to the TMS platform 112. In some configurations, the technology disclosed herein may perform or otherwise facilitate a data validation process with respect to the electronic content 170. Performance of the data validation process may ensure data consistency across unstructured documents (e.g., the electronic content 170). To improve accuracy, different portions of the electronic content 170 cannot provide inconsistent factual information. In some instances, when such inconsistencies are detected, the technology disclosed herein may flag the portions of the electronic content 170 associated with those inconsistencies for verification and, in some instances, for correction.

In further examples, the transportation data 155 may include order information. The order information can include one or more load identifiers. In some examples, a load identifier can be any suitable indication (e.g., vehicle identification number or any other suitable indication) to identify a load (also referred to herein as a transportation order). In some examples, the load identifier is associated with load transportation information (e.g., pickup information (e.g., a pickup location or starting location, an estimated pickup time, pickup driver contact information, a pickup note, etc.), drop-off information (e.g., a drop-off location or destination, an estimated drop-off time, drop-off driver contact information, a drop-off note, etc.), a real-time location of the load(s), a distance between the pickup location and the drop-off location, or any other suitable information associated with the one or more loads to transport). In other examples, the load identifier can include the load transportation information as well. In further examples, the order information can further include an order status, or any other suitable information related to the order. In some examples, the order status can include an available status (e.g., with an assigned driver), an unassigned status (e.g., without an assigned driver), an unclaimed status (e.g., the order before being accepted by the assigned transporter), or any other suitable status.

In further examples, the transportation data 155 can include preorder information. In some examples, a preorder indicates an order without an assigned transporter. The preorder information can include one or more load identifiers, load transportation information corresponding to the one or more load identifiers (e.g., pickup information (e.g., a pickup location, an estimated pickup time, a pickup note, etc.), drop-off information (e.g., a drop-off location, an estimated drop-off time, a drop-off note, etc.), a distance between the pickup location and the drop-off location), and any other suitable information related to the preorder.

In further examples, the transportation data 155 can include location information. The location information can show the pickup location, the drop-off location of the order, or a route between the pickup location and the drop-off location on a map. In further examples, the location information can further show a current location of the load(s) and a traveled route of the load(s) on a map. In some examples, the current location of the load(s) can be tracked by a location sensor in, e.g., the transporter user device(s) 122.

In further examples, the transportation data 155 may include status information. The status information can show an order timeline and where the order is located in the timeline. For examples, the order timeline can include one or more fixed status points (e.g., new order, transporter accept, in transit, delivered, and completed).

In further examples, the transportation data 155 may include activity information. The activity information can show each activity with/without a time of the occurring activity related to the order. For example, the activity information can show when the order is generated, when load(s) is ready for pickup, when the order is output to the transporter or the open marketplace system, when a transportation task message or notification is sent to the user, when load(s) is delivered, when the order is completed, and/or when any other suitable transportation operation is performed.

As noted herein, the system 100 may include the transporter(s) 120 and the shipper(s) 130. The shipper(s) 130 may be associated with one or more vehicle(s) 136 to be transported from a starting location to a destination (or ending location). Accordingly, the shipper(s) 130 may be a user or entity that seeks transportation of one or more vehicle(s) 136. A vehicle 136 may include, e.g., an automobile (e.g., a car, a truck, a van, etc.), a motorcycle, a scooter, a moped, a utility vehicle (e.g., a utility task vehicle (UTV), an all-terrain vehicle (ATV), etc.), a golf cart, equipment or machinery (e.g., a compact loader, a tractor, a forklift, a trencher, a brush cutter, a ride-on lawnmower, etc.), etc. While the technology disclosed herein is described with reference to an automobile, it should be understood that, in some configurations, the technology disclosed herein may be implemented with respect to various types of vehicles and should not be limited to automobiles. The transporter(s) 120 may be a user or entity that performs vehicle transportation operations, such as, e.g., transporting the vehicle(s) 136 from a starting position (or location) to a destination. In some instances, the transporter(s) 120 may include, e.g., a driver, a transport company, a transport company user, or another suitable person or entity to perform vehicle transportation operations. The transporter(s) 120 may perform the vehicle transportation operations using one or more of the transport vehicle(s) 124. The transport vehicle(s) 124 may include, e.g., a single-level trailer, a multi-level trailer, a single-car trailer, a multi-car trailer, an enclosed trailer, an open car trailer, a semi-trailer, a flatbed trailer, a freight truck, an auto carrier, an enclosed multi-level car carrier, etc. In some instances, the transport vehicle(s) 124 may be implemented using an additional tow-vehicle. As one example, the transport vehicle 124 may be a semi-trailer truck that includes a tractor unit and a semi-trailer. As another example, the transport vehicle 124 may include a truck or tractor and a flatbed trailer.

As noted herein, and illustrated in FIG. 1, the transporter(s) 120 may be associated with the transporter user device(s) 122 and the shipper(s) 130 may be associated with the shipper user device(s) 132. The transport user device(s) 122 and the shipper user device(s) 132 may include a computing device, such as a desktop computer, a laptop computer, a tablet computer, a terminal, a smart telephone, a smart television, a smart wearable, or another suitable computing device that interfaces with a user. Although not illustrated in FIG. 1, the transport user device(s) 122 and the shipper user device(s) 132 may include similar components as the server 110, such as electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections. For example, to communicate with the TMS platform 112 (e.g., the TMS application 220 of the server 110), the transport user device(s) 122 and the shipper user device(s) 132 may store a browser application or a dedicated software application executable by an electronic processor. In some configurations, the transport user device(s) 122 and the shipper user device(s) 132 may include additional, fewer, or different components than the server 110. For example, as illustrated in FIG. 1, in some configurations, the transport user device(s) 122 and the shipper user device(s) 132 include a human-machine interface (HMI) 180. The HMI 180 may include one or more input mechanisms (e.g., a keyboard or keypad, one or more buttons, a microphone, or the like) or output mechanisms (e.g., a display device, a speaker, or the like) that allow a user to interact with the transport user device(s) 122 and the shipper user device(s) 132. For example, as illustrated in FIG. 1, the HMI 180 may include a display device 185, such as a screen, monitor, hologram, touchscreen, etc.

The system 100 is described herein as providing a TMS service through the server 110. However, in other configurations, the functionality described herein as being performed by the server 110 may be locally performed by the transport user device(s) 122 or the shipper user device(s) 132. For example, in some configurations, the transport user device(s) 122 or the shipper user device(s) 132 may store one or more components described herein as being stored in the memory 205 of the server 110 (e.g., the application 220, the AI system 225, the learning engine 227, the model database 230, the LLM(s) 235, etc.)

The shipper(s) 120 or the transporter(s) 120 may use the shipper user device(s) 132 and the transporter user device(s) 122, respectively, to interact with the TMS platform 112. For example, the shipper(s) 120 may use the shipper user device(s) 132 to access the TMS platform 112 to, e.g., create a transportation order for a vehicle to be transported, check a status of an existing transportation order, communicate with a transporter of an existing transportation order, etc. The transporter(s) 120 may use the transporter user device(s) 122 to access the TMS platform 112 to, e.g., view a published or pending transportation order, view payout information for a transportation order, claim a published or pending transportation order, communication with a shipper of a transportation order claimed by the transporter 120, provide transportation load identifier(s), provide transporter information (e.g., the transporter data 165), assign drivers to the transport vehicle(s) 124, generate preorder(s), generate order(s), group preorders, group orders, output order(s) to an internal transporter or an open marketplace system, etc. In some configurations, the transporter user device(s) 122 may be carried by a driver and correspond to or be assigned to a particular transport vehicle 124. In such configurations, the transporter user device(s) 122 may automatically generate or update the transporter data 165. For example, the transporter user device(s) 122 may provide and update a transportation order status (e.g., available to perform an order, ready to pick up load(s), arriving at a pickup location (a starting location), moving to a drop-off location (a destination), arriving at a drop-off location, completing an order, etc. As another example, the transporter user device(s) 122 may be coupled with a location tracking device to provide location information of the transport vehicle 124 (or the driver thereof).

Figure 3:
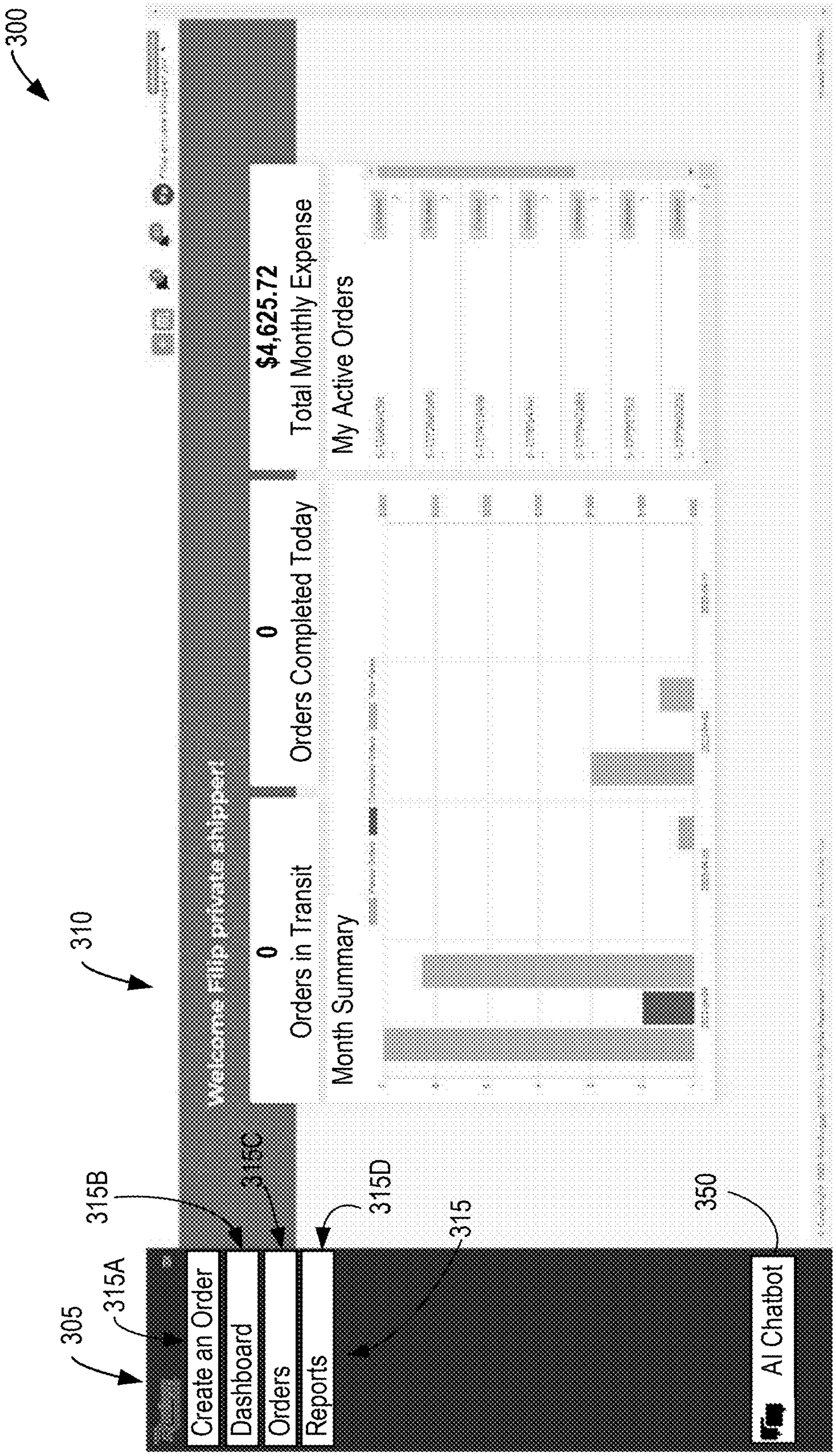
FIG. 3 is a screenshot of an example graphical user interface (GUI) displaying a dashboard for a TMS in accordance with some configurations.

FIG. 3 is a screenshot of an example graphical user interface (GUI) displaying a dashboard for a TMS in accordance with some configurations (also referred to herein as "the dashboard GUI 300"). For example, the TMS implemented on the server 110 can generate a GUI screen to be displayed (via respective display devices 185) on the transporter user device(s) 122 or the shipper user device(s) 132. The transporter(s) 120 or the shipper(s) 130 may interact with the dashboard GUI 300 via, e.g., respective HMIs 180. In some configurations, the dashboard GUI 300 may be rendered based on a particular user (e.g., a particular transporter, a particular shipper, etc.), a user role or title (e.g., a transporter role, a shipper role, etc.), etc. In some instances, the dashboard GUI 300 may function as a home page or a landing page that is presented to a respective user when the TMS application 220 is initially accessed by the respective user (via, e.g., the transporter user device(s) 122, the TMS user device(s) 117, the shipper user device(s) 132, etc.).

As illustrated in FIG. 3, the dashboard GUI 300 may include a menu portion 305 and a content portion 310. The content portion 310 may include content specific to a particular user (e.g., a particular TMS user, a particular shipper 130, a particular transporter 120, etc.). For instance, as illustrated in FIG. 3, the content portion 310 may provide data or information related to, e.g., a monthly summary, active orders, orders in transit, orders completed today, total monthly expense, etc. The content portion 310, or another portion of the dashboard GUI 300, may provide any suitable data described herein. The menu portion 305 may include one or more navigation elements 315. The navigation element(s) 315 may control navigation among various user interfaces (or GUIs) or what content is displayed in the content portion 310 of the dashboard 300. In the example of FIG. 3, the navigation element(s) 315 may include a Create an Order element 315A, a Dashboard element 315B, an Orders element 315C, and a Reports element 315D. As also illustrated in FIG. 3, in some configurations, the menu portion 305 may include an AI chatbot element 350 for human-computer interaction via an AI chatbot, as described in greater detail herein.

Figure 4:
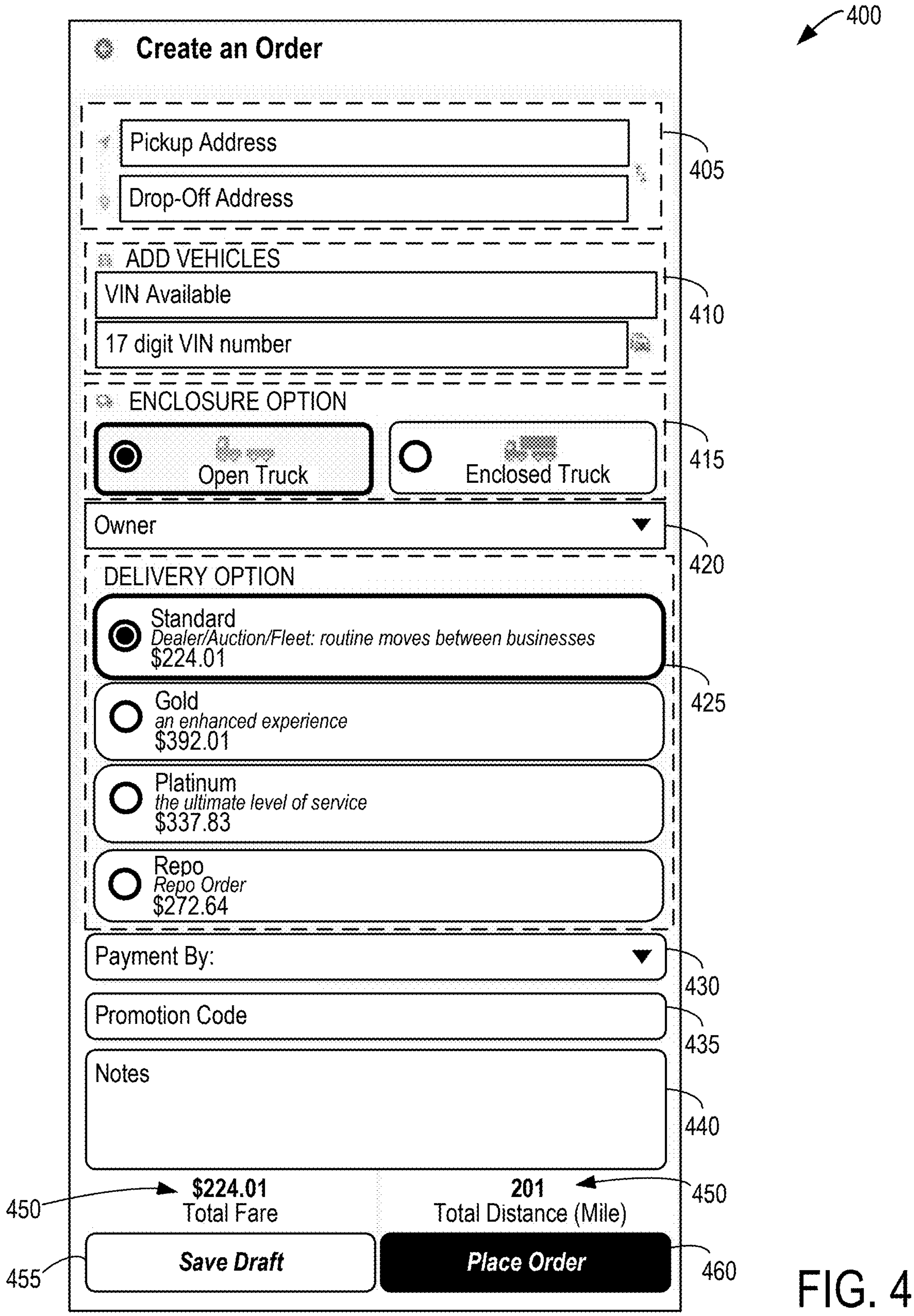
FIG. 4 is a screenshot of an example GUI for order generation in accordance with some configurations

FIG. 4 is a screenshot of an example GUI 400 for order generation in accordance with some configurations (also referred to herein as "the order generation GUI 400"). The server 110 may generate and provide the order generation GUI 400 responsive to a request to generate a new transportation order. For instance, the server 110 may generate and provide the order generation GUI 400 responsive to a user interaction with the Create an Order element 315A of the dashboard GUI 300. As illustrated in FIG. 4, the order generation GUI 400 may include a plurality of GUI elements or components for receiving information or data related to the transportation order being generated.

For instance, the order generation GUI 400 may include a location input portion 405. As illustrated in FIG. 4, the location input portion 405 may include input elements or fields to receive a pick-up location (or a starting position) and a drop-off location (or a destination) associated with the vehicle(s) 136 to be transported. The order generation GUI 400 may include an add vehicle portion 410. The add vehicle portion 410 may include input elements or fields to receive identifying information related to the vehicle(s) 136 to be transported, such as, e.g., a VIN number. The order generation GUI 400 may include an enclosure option portion 415, which may receive an enclosure preference (e.g., an open truck or an enclosed truck). The order generation GUI 400 may include a vehicle owner portion 420, which may receive owner information for the vehicle(s) 136 to be transported. The order generation GUI 400 may include a delivery option portion 425, which includes one or more delivery options available for transporting the vehicle(s) 136 to be transported. The order generation GUI 400 may include a payment portion 430, which may receive payment information for transporting the vehicle(s) 136 to be transported. The order generation GUI 400 may include a promotion code portion 435, which may receive a promotional code or discount code for transporting the vehicle(s) 136 to be transported. The order generation GUI 400 may include a notes portion 440, which may receive notes, comments, requests, additional information, etc. regarding the transportation of the vehicle(s) 136 to be transported. The order generation GUI 400 may include a total fare estimate 445 and a total distance 450, which may be determined based on the information provided in one or more input elements of the order generation GUI 400. The order generation GUI 400 may include a Save Draft button 455, which, responsive to user interaction, may cause the transportation order to be saved as a draft, such that the transportation order may be accessed or completed at a later point in time. The order generation GUI 400 may include a Place Order button 460, which, responsive to user interaction, may cause the transportation order to be placed (e.g., become a preorder within the TMS platform 112).

Figure 5:
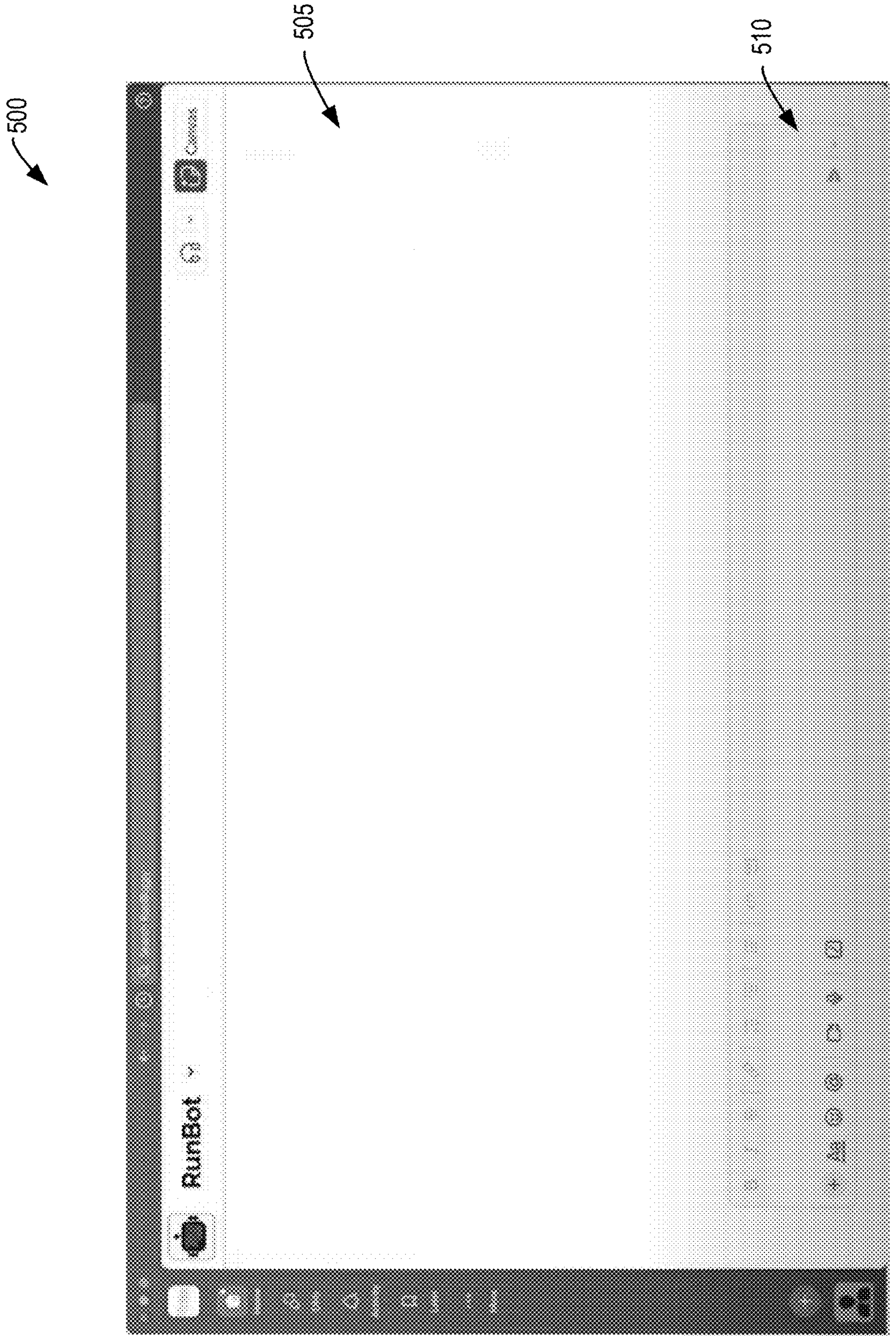
FIG. 5 is a screenshot of an example GUI for an artificial intelligence (AI) chatbot in accordance with some configurations.

FIG. 5 is a screenshot of an example GUI 500 for an AI chatbot in accordance with some configurations (also referred to herein as "the AI chatbot GUI 500"). The server 110 may generate and provide the AI chatbot GUI 500 responsive to a request interact with the AI chatbot. For instance, the server 110 may generate and provide the AI chatbot GUI 500 responsive to a user interaction with the AI chatbot element 350 of the dashboard GUI 300. As described in greater detail herein, a user may interact with the AI chatbot by providing a user query to the AI chatbot, where that user query may relate to the TMS platform 112, such as operation of the TMS application 220, the transportation data 155, etc. As one example, the user query may include: "How do I generate a new transportation order?". As another example, the user query may include: "Please source order number T-1234567890." As yet another example, the user query may include: "How many vehicles have we moved for Shipper A this year?".

As illustrated in FIG. 5, the AI chatbot GUI 500 may include a conversation portion 505 and an input portion 510. The conversation portion 505 may provide a conversation history or summary for human-computer interactions with the AI chatbot. For instance, the conversation portion 505 may include one or more AI chatbot messages (generated by the AI chatbot) and one or more user input messages (generated by a user interacting with the AI chatbot). The input portion 510 may include a message input text field that receives user input from a user, such as, e.g., a text string. For instance, a user may input a user query (e.g., a question to be answered by the AI chatbot) via the input portion 510. After submitting the user query via the input portion 510, a preview of the user query may be provided within the conversation portion 505. Responsive to the user query, the AI chatbot may provide a response (or answer) responsive to the user query, which may be provided within the conversation portion 505.

As noted herein, the system 100 may facilitate (or otherwise provide) one or more TMS processes or functionality, as described herein. In some configurations, the technology disclosed herein provides methods and systems related to an implementation of a prioritization process that advantageously improves order generation and sourcing within the TMS platform 112. Alternatively, or in addition, in some configurations, the technology disclosed herein provides methods and systems related to controlling human-computer interaction via an AI chatbot that advantageously improves accuracy and efficiency of utilizing an AI chatbot within the TMS platform 112.

Figure 6:
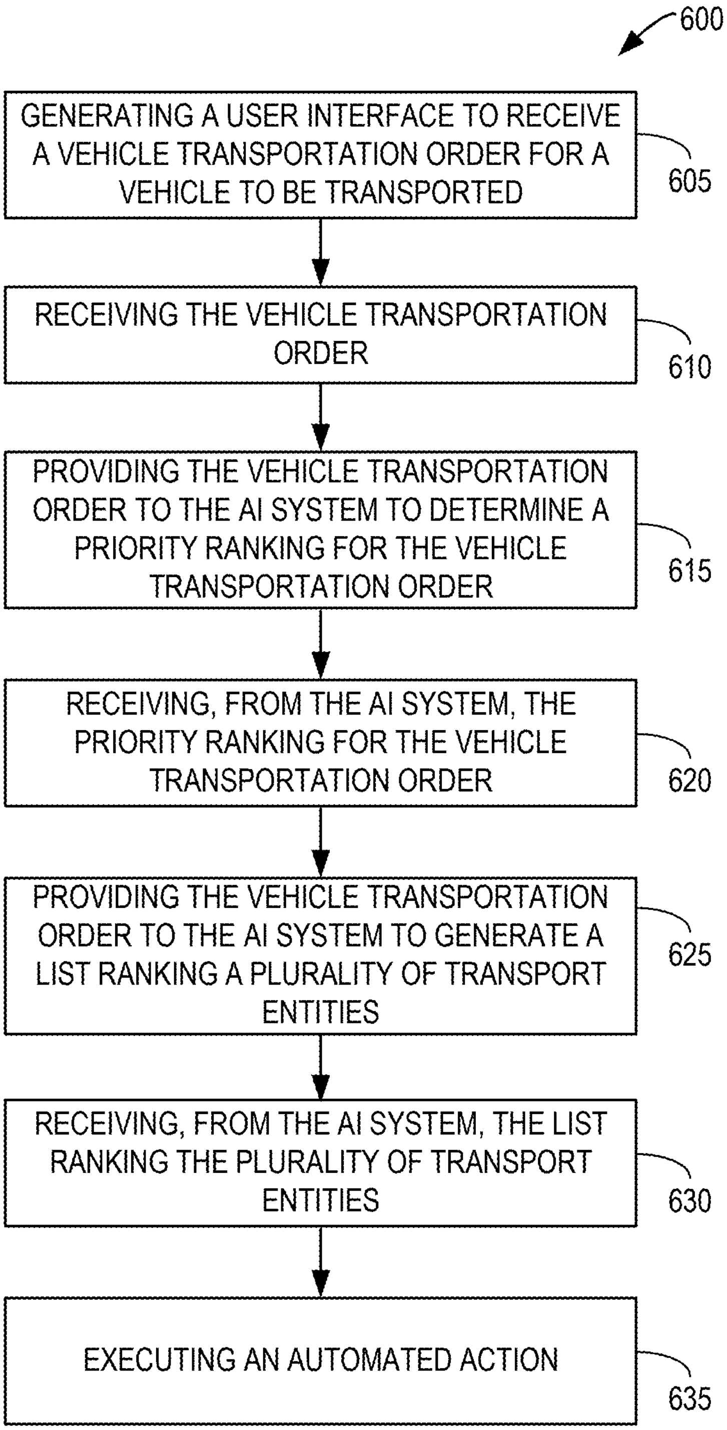
FIG. 6 is a flowchart illustrating an example method to control automated transportation order generation and sourcing within a TMS platform in accordance with some configurations.

FIG. 6 is a flowchart illustrating an example method 600 to control automated transportation order generation and sourcing within the TMS platform 112 in accordance with some configurations. The method 600 is described as being performed by the server 110 and, in particular, the application 220 as executed by the electronic processor 200. However, as noted above, the functionality described with respect to the method 600 may be performed by other devices, such as, e.g., the TMS user device(s) 117, the transporter user device(s) 122, or the shipper user device(s) 132, or distributed among a plurality of devices, such as a plurality of servers included in a cloud service.

As illustrated in FIG. 6, the method 600 may include generating, with the electronic processor 200, a user interface to receive a vehicle transportation order for the vehicle 136 to be transported (at block 605). In some configurations, the user interface generated at block 605 may include (or be similar to) the order generation GUI 400 of FIG. 4. In some configurations, the electronic processor 200 may generate the UI (e.g., the order generation GUI 400) responsive to receipt of a request to create a vehicle transportation order. For instance, with reference to FIGS. 3-4, in some examples, the electronic processor 200 may receive the request responsive to a user interaction with a Create an Order element 315A of the dashboard GUI 300. Following this example, the electronic processor 200 may generate the order generation GUI 400 responsive to receipt of the request. The electronic processor 200 may provide (or otherwise transmit) the order generation GUI 400 for display at a remote device (e.g., the shipper user device(s) 132), such as the remote device associated with the request to create the vehicle transportation order.

The electronic processor 200 may receive the vehicle transportation order (at block 610). For instance, in some configurations, after providing the order generation GUI 400 (e.g., the user interface generated at block 605), the receiving user device (e.g., the shipper user device 132) may display the order generation GUI 400 to a user (e.g., the shipper 130). The user may interact with the order generation GUI 400 by providing information or data into the input fields or elements of the order generation GUI 400. In some configurations, the electronic processor 200 may receive the vehicle transportation order responsive to a user interacting with the Place Order button 460 of the order generation GUI 400. In some configurations, the vehicle transportation order may be a preorder. The vehicle transportation order may include (or otherwise be associated with) information related to transporting the vehicle 136 to be transported. For example, the vehicle transportation order may include the information provided by the user placing the order, such as, e.g., a destination (e.g., a drop-off location), a starting location (e.g., a pick-up location), a vehicle characteristic of the vehicle to be transported (e.g., a make or model of vehicle to be transported, a VIN number or other vehicle identifier of the vehicle to be transported, etc.), etc.

In some configurations, the electronic processor 200 may receive the vehicle transportation order in real-time (or near real-time) subsequent to the vehicle transportation order being placed. Alternatively, or in addition, the electronic processor 200 may receive the vehicle transportation order after a predetermined time interval of the vehicle transportation order being placed (e.g., 15 minutes, hourly, daily, etc.). In some instances, the electronic processor 200 may receive multiple vehicle transportation orders. For example, the electronic processor 200 may receive vehicle transportation orders in bulk pursuant to a predetermined schedule or time interval (e.g., in 15 minutes intervals, hourly, daily, etc.).

The electronic processor 200 may provide the vehicle transportation order to the AI system 225 to determine a priority ranking for the vehicle transportation order (at block 615). In some configurations, a priority ranking may be related to a difficulty associated with sourcing the vehicle transportation order (e.g., a sourcing difficulty or degree of difficulty). For instance, the priority ranking may indicate (or otherwise represent) a prediction of how long a vehicle transportation order may take to source (e.g., from when the vehicle transportation order is placed to when a transporter accepts the order and agrees to complete the order). For instance, when a vehicle transportation order is predicted to have a longer duration between order placement and order sourcing, the vehicle transportation order may be associated with a higher priority ranking. When a vehicle transportation order is predicted to have a shorter duration between order placement and order sourcing, the vehicle transportation order may be associated with a lower priority ranking.

Accordingly, in some instances, the sourcing difficulty (or degree of difficulty) for the vehicle transportation order may refer to how difficult it may be to source transportation of the vehicle(s) 136 of the vehicle transportation order. As such, in some instances, the electronic processor 200 may predict a degree of difficulty associated with sourcing the vehicle transportation order, such that the priority ranking for the vehicle transportation order represents a predicted degree of difficulty associated with sourcing the vehicle transportation order.

As described in greater detail herein, sourcing difficulty may be based on a number of features or factors, such as, e.g., an order type, a route between the pick-up location and the drop-off location, a predicted transporter payout for the vehicle transportation order, a distance between the pick-up location and the drop-off location, a characteristic of the vehicle(s) 136 to be transported (e.g., a vehicle size, a vehicle value, etc.), a characteristic of the pick-up location (e.g., a population density of the pick-up location, a remoteness of the pick-up location, etc.), a characteristic of the drop-off location (e.g., a population density of the pick-up location, a remoteness of the pick-up location, etc.), a certification associated with transporting the vehicle(s) 136, a number or availability of transport entities (e.g., the transporter(s) 120) located within a predetermined radius of the destination that are qualified to complete the vehicle transportation order, a transporter-to-order ratio (e.g., a number of pending orders compared to a number of transporters 120), etc.

In some examples, the electronic processor 200 may facilitate the determination of the priority ranking by providing a prompt to an LLM (e.g., the LLM(s) 235). For instance, the prompt may include, e.g., "Provide a priority ranking for transportation order T-XXX, where the priority ranking is on a scale of 1-10 and indicating a difficulty level for sourcing the transportation order, with 10 being most difficult and 1 being least difficult." In some examples, the electronic processor 200 may provide, along with the prompt, the transportation order information to the LLM (e.g., the LLM(s) 235). In some configurations, the LLM(s) 235 may access have access to a history of transportation orders, each order having associated transportation information as well as sourcing and completion information (e.g., indicating how many days to source, price changes until sourcing, accepted price, transporter feedback, etc.), such that the LLM(s) 235 may generate the priority ranking for the current vehicle transportation order based on, e.g., historical data for previous vehicle transportation orders. Due to the large quantity and wide diversity of historical data, the LLM(s) 235 (or other models of the AI system 225) may be better suited to predict difficulty in sourcing of an order than, e.g., other algorithms, hard coded relationships, conditions, thresholds, or human on-the-fly assessment.

The priority ranking may be a ranking on a multi-level scale of descriptive words that have a particular rank sequence (e.g., low, medium, or high). Alternatively, or in addition, in some configurations, the priority ranking may be a numerical value on a scale (e.g., 0-1, 1-10, 1-100, 1-1000, etc.). In some examples, the descriptive words may correspond to respective ranges of numerical values on a numerical scale and, thus, the electronic processor 200 may generate a numerical score and translate the score to one of the descriptive words on the multi-level scale.

In some configurations, the priority ranking may be dynamic such that the priority ranking for a particular vehicle transportation order by be dynamically updated or modified (e.g., over time). For instance, at a first point in time, the priority ranking for a vehicle transportation order may be a first priority ranking, while at a second, subsequent point in time, the priority ranking for the vehicle transportation order may be dynamically updated to a second priority ranking. In such instances, the priority ranking may be dynamically increased (e.g., to a higher priority ranking) or dynamically decreased (e.g., to a lower priority ranking). As described herein, the priority ranking may be dynamically adjusted based on a period of time (e.g., a lapsing of a predetermined period of time), responsive to a request to update the priority ranking (e.g., a manual request initiated via, e.g., the TMS user device(s) 117), based on changes to data or information associated with the vehicle transportation order (as described in greater detail herein), user interaction with a posted or published vehicle transportation order (e.g., order view data), etc. In some configurations, the electronic processor 200 may dynamically update (or re-determine) the priority ranking for the vehicle transportation order according to a predetermined schedule or interval. As one example, the electronic processor 200 may dynamically update (or re-determine) the priority ranking of a vehicle transportation order every 15 minutes. The electronic processor 200 may determine (or re-determine) a dynamic priority ranking using one or more of the methods or systems as described herein. For instance, the electronic processor 200 may determine the dynamic priority ranking (or re-determine the priority ranking) using the AI system 225 (or one or more models thereof), as described in greater detail herein.

As one example, when the vehicle transportation order has remained unclaimed by a transporter 120 for a period of time, the electronic processor 200 may dynamically update the priority ranking of the vehicle transportation order, such as, e.g., by increasing the priority ranking. As another example, in some instances, a TMS user may request that the priority ranking for a vehicle transportation order be re-determined (or updated). Following this example, in such instances, when the electronic processor 200 receives a request, such as, e.g., from the TMS user device(s) 117, to check or re-determine the priority ranking for a vehicle transportation order, the electronic processor 200 may determine (or re-determine) the priority ranking for the vehicle transportation order. In some instances, such a determination may include modifying the original priority ranking for the vehicle transportation order. However, in other instances, such a determination may not involve modifying the original priority ranking for the vehicle transportation order (such as, e.g., when the re-determination results in the same priority ranking as previously determined). As yet another example, when the data or information associated with the vehicle transportation order (e.g., one or more features thereof) changes, the electronic processor 200 may re-determine (or check) the priority ranking for the vehicle transportation order based on those changes. As yet another example, when the electronic processor 200 determines that user interaction with the vehicle transportation order (e.g., a number of user views, a user dwell time, etc.) indicates a lack of interest in the vehicle transportation order, the electronic processor 200 may re-determine (or update) the priority ranking for the vehicle transportation order.

As noted above, in some configurations, the electronic processor 200 may providing the vehicle transportation order to the AI system 225 to determine the priority ranking for the vehicle transportation order. For instance, in some configurations, the electronic processor 200 may provide the vehicle transportation order (as input) to one or more models of the AI system 225 (e.g., the LLM(s) 235). In some examples, the electronic processor 200 may provide the vehicle transportation order to an aged order machine learning model of the AI system 225.

In some configurations, the aged order machine learning model may determine a completion prediction for the vehicle transportation order (e.g., when the vehicle transportation order will be completed, such that the vehicle 136 is delivered to the destination). In some instances, the aged order machine learning model may determine whether the vehicle transportation order will be completed within a period of time (e.g., a predetermined period of time, such as, e.g., one week, from the vehicle transportation order being placed. As such, in some instances, the aged order machine learning model may predict a degree of difficulty associated with sourcing the vehicle transportation order (or completing the vehicle transportation order), such that the priority ranking for the vehicle transportation order represents a predicted degree of difficulty associated with sourcing (or completing) the vehicle transportation order.

As noted above, how long a vehicle transportation order takes to source may be based on one or more features, such as, e.g., order type details, route details, payout prediction statistics, distance, population density, availability of transporter entities (e.g., the transporter(s) 120) located within a predetermined radius of the destination, etc. As such, in some instances, the aged order machine learning model may determine the degree of difficulty for the vehicle transportation order based on one or more features associated with the vehicle transportation order. Based on the degree of difficulty, the aged order machine learning model may determine the priority ranking for the vehicle transportation order. Alternatively, or in addition, in some instances, the aged order machine learning model may provide the degree of difficulty to the electronic processor 200 and the electronic processor 200 may determine the priority ranking of the vehicle transportation order based on the degree of difficulty.

As one specific example, when the aged order machine learning model predicts that it will take more than one week to source the vehicle transportation order (indicative of a higher degree of difficulty), the aged order machine learning model (or the electronic processor 200) may determine the priority ranking of the vehicle transportation order to be a high priority ranking. When the aged order machine learning model predicts that it will take three days to complete the vehicle transportation order (indicative of a moderate degree of difficulty), the aged order machine learning model (or the electronic processor 200) may determine the priority ranking of the vehicle transportation order to be a medium priority ranking. When the aged order machine learning model predicts that it will take one day to complete the vehicle transportation order (indicative of a low degree of difficulty), the aged order machine learning model (or the electronic processor 200) may determine the priority ranking of the vehicle transportation order to be a low priority ranking.

Accordingly, in some configurations, the electronic processor 200 may receive, from the AI system 225 (e.g., the aged order machine learning model thereof), the priority ranking for the vehicle transportation order (at block 620).

In some instances, the electronic processor 200 (or the AI system 225) may determine the priority ranking based on a priority list. The priority list may include one or more entities (e.g., the shipper(s) 130) that are indicated as high priority entities. For example, when a shipper 130 is a new user of the TMS platform 112 or a priority user of the TMS platform 112, vehicle transportation orders associated with the shipper 130 may automatically be determined as having a high priority ranking. As such, in some configurations, the electronic processor 200 (or the AI system 225) may determine whether the vehicle transportation order is associated with an entity (e.g., a shipper) included in a priority list. When the vehicle transportation order is associated with an entity included in the priority list, the electronic processor 200 (or the AI system 225) may automatically determine the vehicle transportation order as having a high priority ranking. When the vehicle transportation order is not associated with an entity included in the priority list, the electronic processor 200 (or the AI system 225) may determine the priority ranking for the vehicle transportation order as otherwise described herein (e.g., based on a degree of difficulty or one or more features of the vehicle transportation order).

Figure 7:
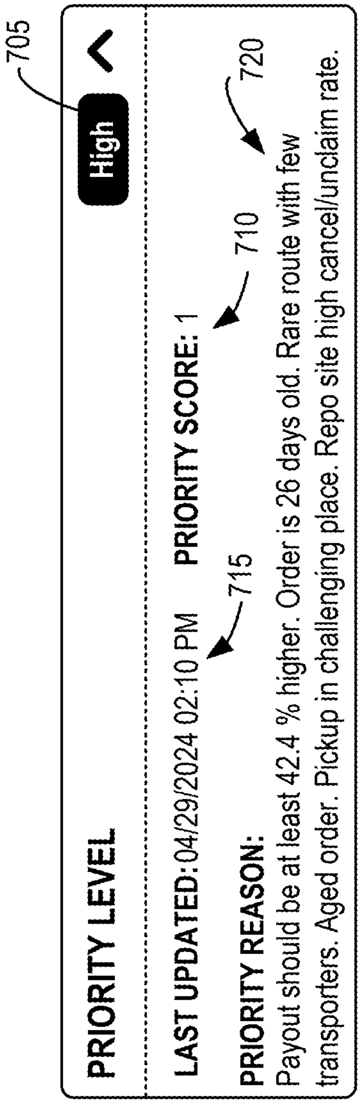
FIG. 7 is a screenshot of an example GUI including a priority ranking for a vehicle transportation order in accordance with some configurations.

In some configurations, the electronic processor 200 may provide the priority ranking (or information associated therewith) via a GUI (such as, e.g., one or more GUIs as described herein) to a remote device for display to a user of the remote device (e.g., the TMS user device(s) 117, the shipper user device(s) 132, the transporter user device(s) 122, etc.). For example, FIG. 7 is a screenshot of an example GUI 700 including the priority ranking for a vehicle transportation order in accordance with some configurations. As illustrated in FIG. 7, the GUI 700 may include a priority ranking indicator 705, a priority ranking score 710, a last updated indicator 715, and a priority reason 720.

The electronic processor 200 may provide the vehicle transportation order to the AI system 225 to generate a list ranking a plurality of transport entities (e.g., the transporters 120) (at block 625). The list ranking the transporters 120 may include one or more of the transporters 120 in a particular ranking sequence. The ranking sequence of the transporters 120 may be based on how qualified or recommended each transporter 120 is for the vehicle transportation order. As such, the list ranking the transporters 120 may be particular or specific to a vehicle transportation order (e.g., based on one or more features of the vehicle transportation order). For example, a first vehicle transportation order may be associated with a first list ranking a first subset of the transporters 120 and a second vehicle transportation order may be associated with a second list ranking a second subset of the transporters 120. In some instances, the first subset and the second subset are different (e.g., include at least one different transporter or different ranking sequence of the same transporters). The list ranking the transporters 120 may include the transporters 120 that are qualified to complete the vehicle transportation order. For instance, the list ranking the transporters 120 may only include the transporters 120 that are equipped, certified, or otherwise qualified to complete the vehicle transportation order. As one example, when the vehicle transportation order involves a particular certification to complete, the list ranking the transporters 120 may only include the transporters 120 with that particular certification. As another example, when the vehicle transportation order specifies an enclosed trailer, the list ranking the transporters 120 may only include the transporters 120 with enclosed trailers.

In some configurations, the electronic processor 200 may provide the vehicle transportation order to the AI system 225 to generate a list ranking the plurality of transport entities based on (or responsive to) the priority ranking of the vehicle transportation order. For instance, the electronic processor 200 may prioritize vehicle transportation orders with a higher priority ranking (e.g., a high priority ranking) over lower priority ranking (e.g., a medium priority ranking or a low priority ranking). As such, the technology disclosed herein allows prioritization of vehicle transportation orders that may be more difficult to source and complete in an effort to expedite completion of those vehicle transportation orders, such as, e.g., by expediting notification or recommendation of those vehicle transportation orders to recommended transporters in an effort to have recommended transporters claim those vehicle transportation orders more quickly, as described in greater detail herein.

Accordingly, in some configurations, the electronic processor 200 may facilitate the determination of a list ranking the transporters 120 based on a priority ranking of the vehicle transportation orders. In some instances, the electronic processor 200 may facilitate determining the list ranking the transporters 120 according to a predetermined schedule based on priority ranking. For instance, the electronic processor 200 may facilitate determining the list ranking the transporters 120 for vehicle transportation orders having a high priority ranking immediately (e.g., in real-time or near real-time) after determining the priority rankings. The electronic processor 200 may facilitate determining the list ranking the transporters 120 for vehicle transportation orders having a medium priority ranking, e.g., six hours after determining the priority rankings. The electronic processor 200 may facilitate determining the list ranking the transporters 120 for vehicle transportation orders having a low priority ranking, e.g., one day after determining the priority rankings. As such, in some examples, transporter rankings may be determined based on priority ranking, where transporter rankings for high priority ranking orders are generally determined in real-time (or near real-time), transporter rankings for medium priority ranking orders may be determined with a minor delay, and transporter rankings for low priority ranking orders may be determined with a moderate delay.

As noted herein, the electronic processor 200 may implement the AI system 225 in order to determine the transporter rankings (e.g., the list ranking the transporters 120). In some configurations, the electronic processor 200 may provide the vehicle transportation order to the AI system 225 to determine the transporter ranking for the vehicle transportation order. For instance, in some configurations, the electronic processor 200 may provide the vehicle transportation order (as input) to one or more models of the AI system 225 (e.g., the LLM(s) 235). In some examples, the electronic processor 200 may provide the vehicle transportation order to a transporter rankings machine learning model of the AI system 225.

Responsive to receiving the vehicle transportation order, the transporter rankings machine learning model (e.g., the AI system 225) may determine a ranking for each of the transporters 120. The ranking for each of the transporters 120 may be relative to other transporters 120. In some configurations, the AI system 225 may determine a ranking for a transporter 120 based on the transportation data 155, the vehicle transportation order, any other suitable data or information related to the TMS platform 112, etc. For instance, in some configurations, the AI system 225 may determine a ranking for a transporter 120 based on information or data related to the vehicle transportation order, such as, e.g., a characteristic of the vehicle 136 to be transported, a starting location, a destination, etc. Alternatively, or in addition, the AI system 225 may determine the ranking for a transporter 120 based on the transporter data 165. As one example, the AI system 225 may query the database(s) 115 for the transporter data 165 (or a portion thereof) that is related to the transporter 120. The AI system 225 may then, based on the transporter data 165 queried from the database(s) 115, determine a ranking for the transporter 120. For instance, the AI system 225 may determine a ranking for a transporter based on information related to, e.g., one or more previous orders, a location (or driver location), order view data, how active the transporter 120 on the TMS platform 112 (e.g., TMS platform usage data), one or more active orders, a future location (or future driver location), one or more characteristics of the transport vehicle(s) 124 of the transporter 120, one or more permissions of the transporter 120 (e.g., certificates, licenses, registrations, permits, etc.), etc.

Accordingly, in some configurations, the electronic processor 200 may receive, from the AI system 225 (e.g., the transporter ranking machine learning model thereof), the list ranking the plurality of transport entities (e.g., the transporter(s) 120) (at block 630).

The electronic processor 200 may execute an automated action (at block 635). The automated action may be for the vehicle transportation order and may be (ultimately) responsive to the priority ranking for the vehicle transportation order (from block 620). For example, in some configurations, the electronic processor 200 may execute the automated action based on the list ranking the plurality of transport entities (e.g., the transporter(s) 120). In some configurations, the automated action may be executed as an attempt to increase the speed at which the vehicle transportation order is claimed by one of the transporters 120 (or completed). In some configurations, the electronic processor 200 may execute the automated action (e.g., control a list of recommended vehicle transportation orders, provide a notification (or message) recommending the vehicle transportation order, etc.) for a predetermined number of transporters, such as, e.g., the top twenty transporters included in the list ranking the transporters 120.

Figure 8:
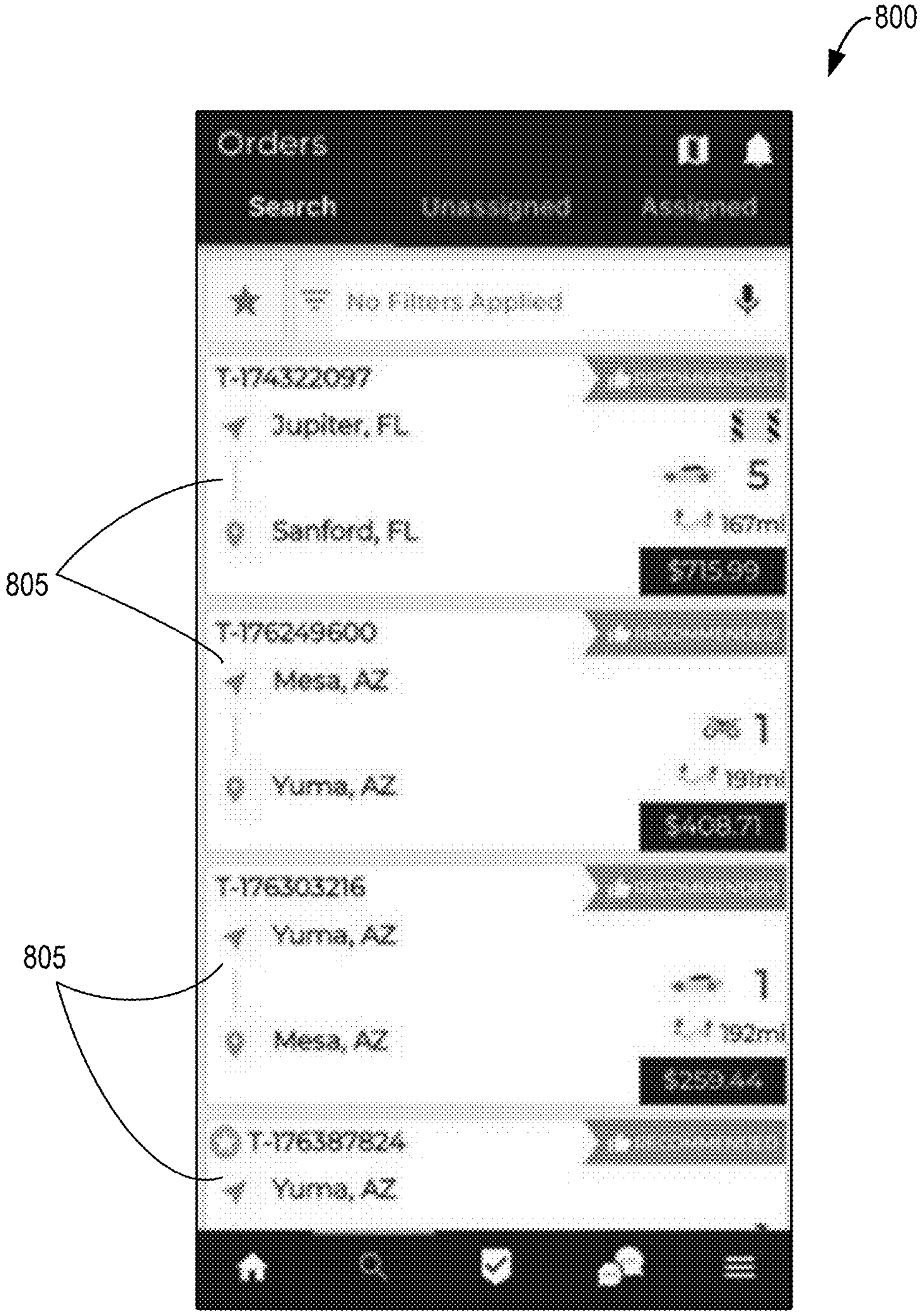
FIG. 8 is a screenshot of an example GUI for recommending vehicle transportation orders to a transporter in accordance with some configurations.

In some configurations, the electronic processor 200 may execute the automated action by controlling a list of recommended vehicle transportation orders for one or more of the transporters 120. In some examples, the electronic processor 200 may control the list of recommended vehicle transportation orders by generating, updating, or reordering a list of recommended vehicle transportation orders. For instance, each transporter may have access to a list of vehicle transportation orders that are specifically recommended for that transporter. As an example, a first transporter may be associated with a first list of recommended vehicle transportations orders while a second transporter may be associated with a second list of recommended vehicle transportation orders. The list of recommended vehicle transportation orders for a given transporter may be generated and provided to the transporter user device 122 for display to the transporter 120 such that the transporter 120 may interact with (e.g., view, claim, dismiss, etc.) with the list of recommended vehicle transportation orders. For example, FIG. 8 is a screenshot of an example GUI 800 for recommending vehicle transportation orders to the transporter 120 in accordance with some configurations. In the example of FIG. 8, the GUI 800 includes a plurality of recommended vehicle transportation orders 805 for the transporter 120 (e.g., the list of recommended vehicle transportation orders). As illustrated, each recommended vehicle transportation order 805 may provide related information, such as, e.g., an order number, a starting location, a destination, a distance, payout information, a number of vehicles to be transported, information relating to the vehicle(s) to be transported, etc.

In some configurations, the electronic processor 200 may execute the automated action by updating the list of recommended vehicle transportation orders. The electronic processor 200 may update the list of recommended vehicle transportation orders based on the list ranking the transporters 120 for the vehicle transportation order. The electronic processor 200 may update the list of recommended vehicle transportation orders by, e.g., adding a new recommended vehicle transportation order, removing an existing recommended vehicle transportation order, changing the order in which recommended vehicle transportation orders are arranged within the list of recommended vehicle transportation order, etc.

For instance, in some configurations, the electronic processor 200 may add the vehicle transportation order to a list of recommended vehicle transportation orders for one or more transporters included in the list ranking the transporters 120 for that vehicle transportation order. For a given transporter included in the list ranking the transporters 120, the electronic processor 200 may determine a list position for the vehicle transportation order within the list of recommended vehicle transportation orders for that given transporter based on a ranking of that given transporter in the list ranking the transporters 120. As one example, when a transporter is the top ranked transporter for the vehicle transportation order, the electronic processor 200 may update a list of recommended vehicle transportation orders for the transporter such that the vehicle transportation order is listed first in the list of recommended vehicle transportation orders for the transporter.

Accordingly, in some configurations, the electronic processor 200 may determine a list of recommended vehicle transportation orders for the transporter(s) 120. In some instances, the electronic processor 200 may determine the list of recommended vehicle transportation orders for the transporters 120 included in the list ranking the transporters for the vehicle transportation order. The list of recommended vehicle transportation orders may be based on a corresponding ranking of the transporters 120 with respect to the recommended vehicle transportation orders included in the list of recommended vehicle transportation orders. In some instances, the list or recommended vehicle transportation orders may include the vehicle transportation order. The electronic processor 200 may generate a GUI that includes the list of recommended vehicle transportation orders for the transporters 120 (e.g., the GUI 700 of FIG. 7). The electronic processor 200 may then transmit (or otherwise provide) the GUI to corresponding transporter user devices 122 such that each transporter 120 may view their corresponding list of recommended vehicle transportation orders on their transporter user device 122.

In some configurations, the electronic processor 200 may execute the automated action by controlling (or generating) a list of recommended transporters for the vehicle transportation order and, in some instances, providing the list of recommended transporters to the TMS user device(s) 117 such that, e.g., a TMS user may interact with the list of recommended transporters (e.g., as a direct contact list for sourcing the vehicle transportation order). The list of recommended transporters for the vehicle transportation order may include, e.g., transporters included in the list ranking the transporters. For instance, the list of recommended transporters for the vehicle transportation order may include a predetermined number or portion of the list ranking the transporters 120, such as, e.g., the top twenty ranked transporters 120 for the vehicle transportation order. In some configurations, the electronic processor 200 may associate (or otherwise link) the list of recommended transporters for the vehicle transportation order with the vehicle transportation order. As one example, the electronic processor 200 may supplement the vehicle transportation order such that the vehicle transportation order indicates the list or recommended transporters for the vehicle transportation order. As another example, the electronic processor 200 may store the vehicle transportation order in association with the list of recommended transporters for the vehicle transportation order. As yet another example, electronic processor 200 may associate each transporter account of the transporters 120 included in the list of recommended transporters with the vehicle transportation order.

Figure 9:
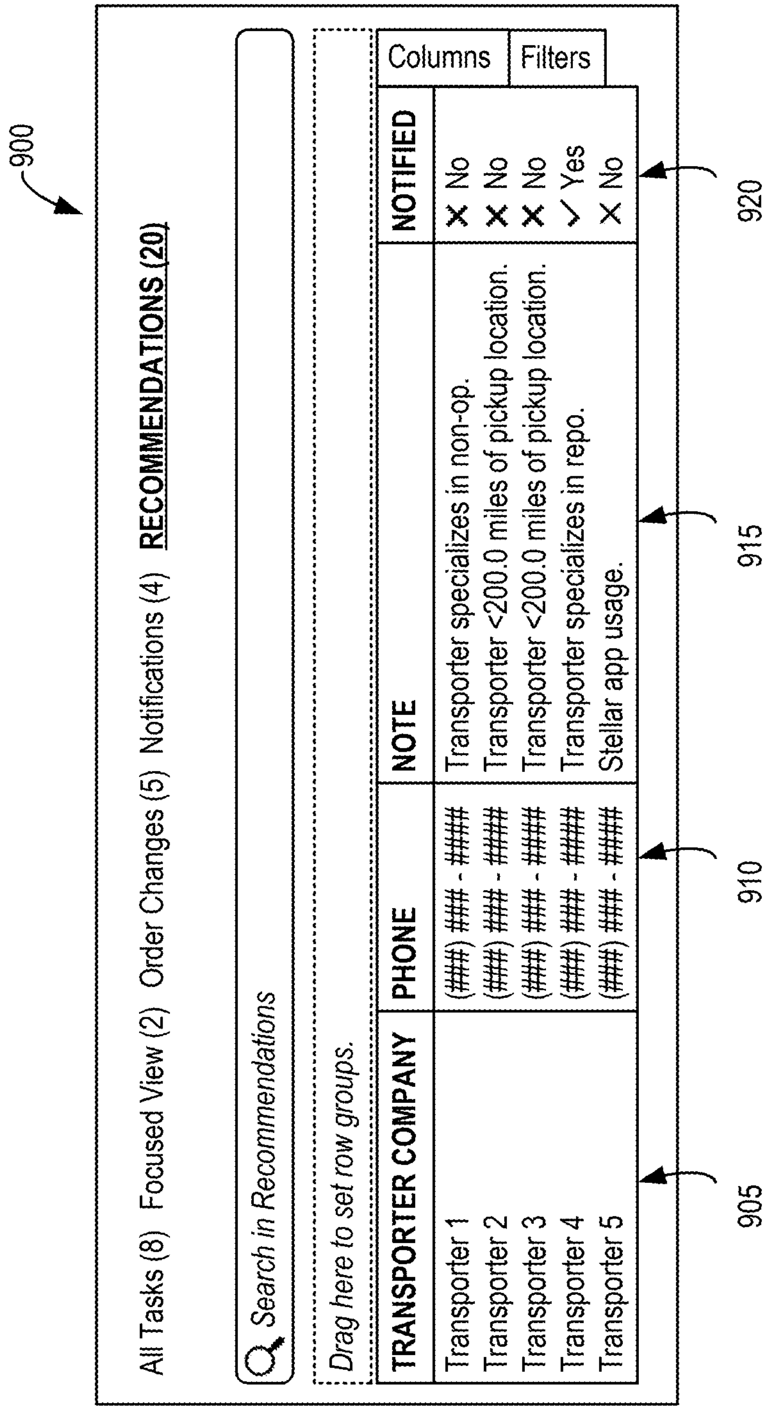
FIG. 9 is a screenshot of an example GUI including a list of recommended transporters for a vehicle transportation order in accordance with some configurations.

In some configurations, the electronic processor 200 may generate a GUI including the list of recommended transporters for the vehicle transportation order. In some instances, the electronic processor 200 may transmit (or otherwise provide) the GUI including the list of recommended transporters for the vehicle transportation order to the TMS user device(s) 117 for display to a TMS user, such that the TMS user may interact with or monitor the progress of the vehicle transportation order, perform an operations task or action based on the list of recommended transporters for the vehicle transportation order, etc. For example, FIG. 9 is a screenshot of an example GUI 900 including a list of recommended transporters 905 for a vehicle transportation order in accordance with some configurations. In the example of FIG. 9, the GUI 900 includes, for each recommended transporter included in the list of recommended transporters 905, contact information 910, notes information 915, and an indication 920 of whether the recommended transporter has been contacted (or otherwise notified) regarding the vehicle transportation order.

Accordingly, in some configurations, the electronic processor 200 may determine a list of recommended transporters for the vehicle transportation order based on, e.g., the list ranking the transporters 120. In some examples, each recommended transporter included in the list of recommended transporters may be associated with context data related to the recommended transporter being recommended for the vehicle transportation order. For example, the context data may indicate the vehicle transportation order being recommended, a reason that the vehicle transportation order is recommended for the corresponding recommended transporter, etc. The electronic processor 200 may generate a GUI including the list of recommended transporters, the associated context data for each recommended transporter, etc. The electronic processor 200 may transmit (or otherwise provide) the GUI to a remote device for display, such as, e.g., the TMS user devices 117 such that a TMS user (e.g., an operations user of the TMS platform 112) may interact with the list of recommended transporters, the associated context data, etc. For instance, in some configurations, the TMS user may directly contact or communication with one or more recommended transports in an effort to solicit the one or more recommended transport to claim the vehicle transportation order.

In some configurations, the electronic processor 200 may execute the automated action by monitoring a preorder state of the vehicle transportation order. The preorder state of the vehicle transportation order may represent a duration of time in which the vehicle transportation order remains unclaimed (e.g., how long the vehicle transportation order stays in a preorder state). For instance, the electronic processor 200 may monitor how long the vehicle transportation order is in a preorder state (e.g., a duration of the preorder state of the vehicle transportation order). The electronic processor 200 may determine whether the duration of the preorder state of the vehicle transportation order satisfies a preorder threshold or criterion. The preorder threshold or criterion may be an amount of time that, when reached or elapsed, triggers a remedial action. As one example, when the electronic processor 200 determines that the vehicle transportation order has remained unclaimed (or in a preorder state) for two hours (as the preorder threshold or criterion), the electronic processor 200 may take remedial action with respect to the vehicle transportation order. In some configurations, the remedial action may include providing a notification or message to one or more of the transporter user device(s) 122. In some instances, the electronic processor 200 may provide the notification to the transporter under device(s) 122 associated with the transports 130 included in the list ranking the transporters (or the list of recommended transporters) for the vehicle transportation order. In some configurations, the electronic processor 200 may provide the notification or message to transporter user device(s) 122 based on user preferences of the corresponding transporters (e.g., whether the transporter 120 has enabled or turned on such notifications).

Figure 10:
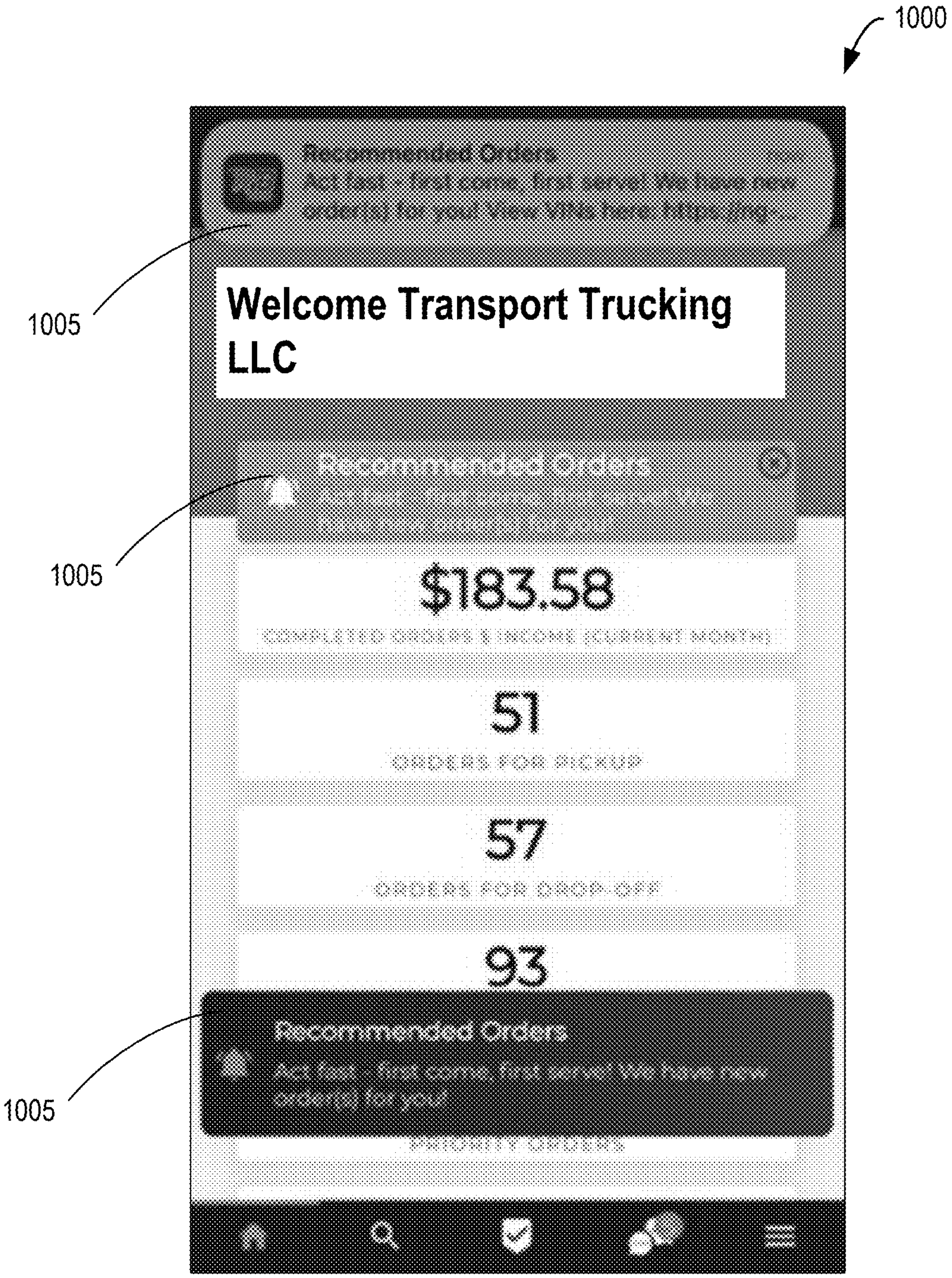
FIG. 10 is a screenshot of an example GUI for notifying a transporter of a recommended vehicle transportation order in accordance with some configurations.

For example, FIG. 10 is a screenshot of an example GUI 1000 for notifying a transporter of a recommended vehicle transportation order in accordance with some configurations. As illustrated in FIG. 10, the GUI 1000 may provide one or more notifications or messages (represented in FIG. 10 by reference numeral 1005) such that the transporter 120 may be notified or alerted to the recommended vehicle transportation order. In some examples, the GUI 1000 may include the notification(s) or message(s) 1005 as a remedial action triggered based on a preorder state of the vehicle transportation order. Alternatively, or in addition, in some examples, the GUI 1000 may include the notification(s) or message(s) 1005 responsive to a request initiated by a TMS user via a TMS user device 117. In some instances, the notification(s) or message(s) 1005 may be generated as in-app notifications (e.g., while the transporter 120 is actively interacting with the TMS platform 112 (or the application 220)). Alternatively, or in addition, in some instances, the notification(s) or message(s) 1005 may be generated when the transporter 120 is not actively interacting with the TMS platform 112 (or the application 220), based on, e.g., one or more notification settings or preferences established by the transporter 120.

Accordingly, in some configurations, the electronic processor 200 may control a listing of open vehicle transportation orders (e.g., preorders or vehicle transportation orders that are in a preorder state). The listing of open vehicle transportation orders may be generally accessible via the TMS platform 112 by, e.g., the transporters 120, such that the transporter(s) 120 may claim one or more open vehicle transportation orders (e.g., provided via a GUI that includes the listing of open vehicle transportation orders). The electronic processor 200 may update the listing of open vehicle transportation orders to include the vehicle transportation order. The electronic processor 200 may monitor a duration of time in which the vehicle transportation order remains unclaimed by a transporter (e.g., a preorder state of the vehicle transportation order). The electronic processor 200 may determine, based on the duration of time, a period of time that the vehicle transportation order is included in the listing of open vehicle transportation orders. The electronic processor 200 may determine whether the period of time satisfies the preorder threshold or criterion. When the electronic processor 200 determines that the period of time satisfies the preorder threshold or criterion, the electronic processor 200 may generate a notification regarding the vehicle transportation order for one or more of the transporters 120 included in the list ranking the transporters 120. The electronic processor 200 may transmit (or otherwise provide) the notification to the transporter user device 122 of the transporter(s) 120 for display.

The electronic processor 200 may monitor progress of the vehicle transportation order after the vehicle transportation order has been claimed by a transporter 120. In some cases, after a vehicle transportation order is claimed, the vehicle transportation order may experience delay in completion (e.g., due to transporter delays). As such, in some instances, the electronic processor 200 may monitor how the vehicle transportation order progresses towards completion such that any potential delay may be mitigated or eliminated.

Accordingly, in some configurations, the electronic processor 200 may perform a delay prioritization process in accordance with some configurations herein. In such configurations, the electronic processor 200 may provide the vehicle transportation order and status data to the AI system 225. The status data may represent (or otherwise include) a summary of how the vehicle transportation order has progressed, such as, e.g., one or more statuses of the vehicle transportation order, one or more actions performed with respect to the vehicle transportation order, one or more timestamps, one or more user-provided comments or notes, etc. The status data may include structured data, unstructured data (or raw data), or a combination thereof related to the vehicle transportation order. For example, FIG. 11 is a screenshot of an example GUI 1100 that includes the status data for a vehicle transportation order in accordance with some configurations.

In some configurations, the electronic processor 200 may leverage or utilize the AI system 225 (e.g., the LLM(s) 235 thereof) to identify delays (e.g., faults). In some examples, the electronic processor 200 may provide the vehicle transportation order and the status data to the AI system 225 (or a model thereof) to detect a fault associated with the vehicle transportation order, determine a severity of the fault, or a combination thereof. In some examples, the fault may represent a delay with respect to completion of the vehicle transportation order. The AI system 225 (or a machine learning model thereof) may detect the fault or determine the severity of the fault based on the vehicle transportation order, the status data, or any other suitable data described herein (e.g., the transportation data 155). In some configurations, the unstructured data may be augmented using natural language processing, one or more of the LLM(s) 235, etc. For example, in some examples, the AI system 225 may implement natural language processing when detecting the fault or determining the severity of the fault (such as when the status data includes unstructured or raw data, including, e.g., user comments or notes). The electronic processor 200 may receive, from the AI system 225 (or a machine learning model thereof), an indication of the fault and the severity of the fault for the vehicle transportation order. The electronic processor 200 may generate, based on the fault or the severity of the fault an alert indicative of the fault or the severity of the fault. The electronic processor 200 may transmit (or otherwise provide) the alert to a remote device, such as, e.g., the TMS user device(s) 117, such that a TMS user may perform one or more remedial actions or tasks to address the fault detected with the vehicle transportation order.

Alternatively, or in addition, in some configurations, the electronic processor 200 may generate a vehicle transportation order delay list (e.g., as part of the alert). The vehicle transportation order delay list may rank vehicle transportation orders associated with a fault, such as, e.g., based on a severity of the detected fault. For example, FIG. 12 is a screenshot of an example GUI 1200 including a vehicle transportation order delay list 1205. In the example of FIG. 12, the GUI 1200 indicates whether a vehicle transportation order delay is associated with a fault (or delay) (represented in FIG. 12 by reference numeral 1210). In some configurations, the GUI 1200 may include a fault severity portion 1215. The fault severity portion 1215 may include one or more dynamic severity indicators. A dynamic severity indicator may represent a severity of a respective fault. The dynamic severity indicator may be dynamically updated in real-time (or near real-time) responsive to a change in severity of the fault. The dynamic severity indicators may visually represent severity such as, e.g., based on a visual characteristic or distinction between different dynamic severity indicators (e.g., via different colors, patterns, formatting, etc.). For instance, a first severity level may be visually indicated by a first dynamic severity indictor with a first visual characteristic while a second severity level may be visually indicated by a second dynamic severity indicator with a second, different visual characteristic. Accordingly, in some configurations, the electronic processor 200 may monitor the vehicle transportation order(s) to determine whether a fault or a corresponding severity of the fault has changed, and, responsive to a change, the electronic processor 200 may update the GUI 1200 (e.g., a corresponding dynamic severity indicator, etc.).

As noted herein, the system 100 may facilitate (or otherwise provide) one or more TMS processes or functionality, as described herein. In some configurations, the technology disclosed herein provides methods and systems related to an implementation of a prioritization process that advantageously improves order generation and sourcing within the TMS platform 112 (e.g., as described herein with respect to the method 600 of FIG. 6). Alternatively, or in addition, in some configurations, the technology disclosed herein provides methods and systems related to controlling human-computer interaction via an AI chatbot that advantageously improves accuracy and efficiency of utilizing an AI chatbot within the TMS platform 112.

Figure 13:
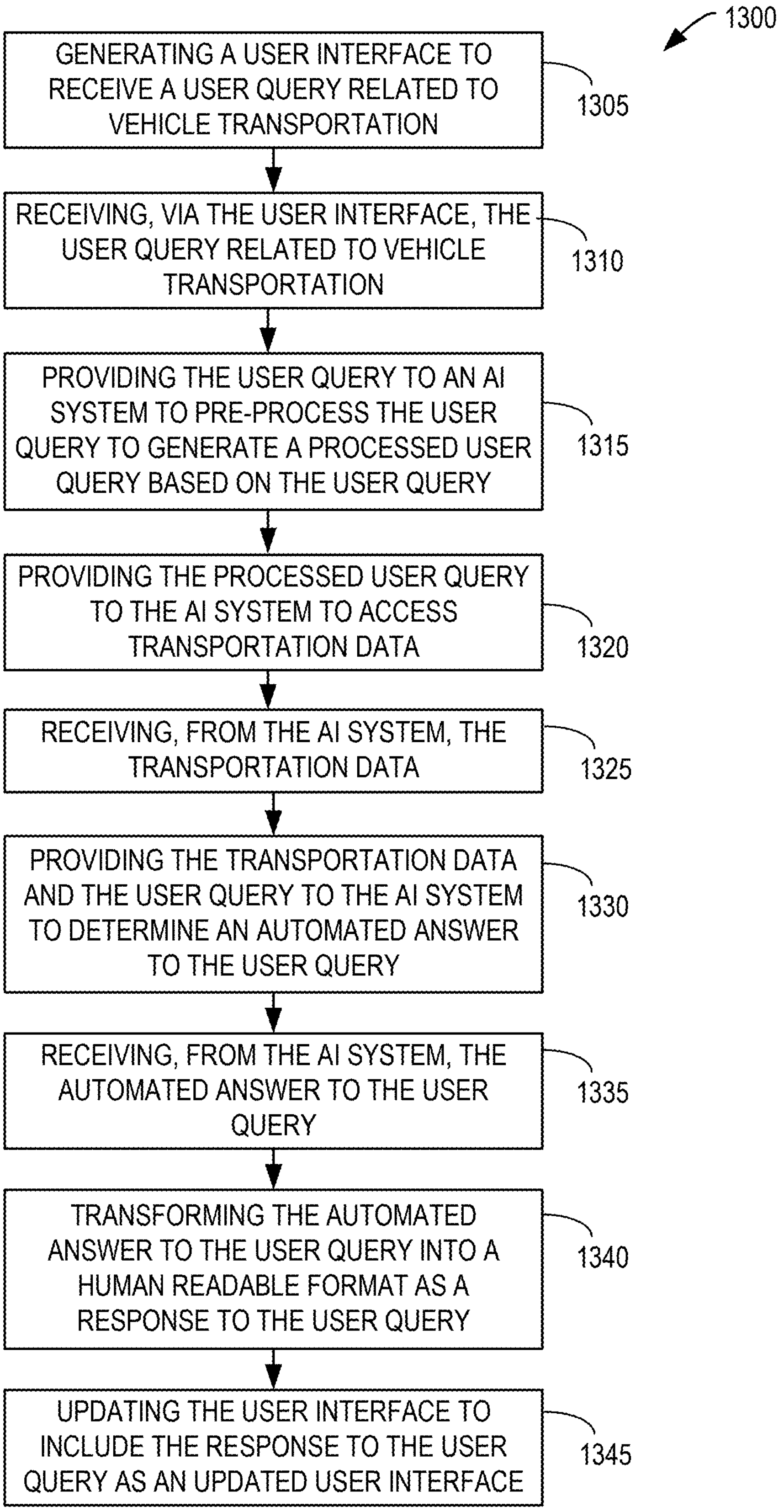
FIG. 13 is a flowchart illustrating an example method to control human-computer interaction via an AI chatbot within the TMS platform in accordance with some configurations.

For example, FIG. 13 is a flowchart illustrating an example method 1300 to control human-computer interaction via an AI chatbot within the TMS platform 112 in accordance with some configurations. The method 1300 is described as being performed by the server 110 and, in particular, the application 220 as executed by the electronic processor 200. However, as noted above, the functionality described with respect to the method 1300 may be performed by other devices, such as, e.g., the TMS user device(s) 117, the transporter user device(s) 122, or the shipper user device(s) 132, or distributed among a plurality of devices, such as a plurality of servers included in a cloud service.

As illustrated in FIG. 13, the method 1300 may include generating, with the electronic processor 200, a user interface to receive a user query related to vehicle transportation (at block 1305). In some configurations, the user interface generated at block 1305 may include (or be similar to) the AI chatbot GUI 500 of FIG. 5. In some configurations, the electronic processor 200 may generate the UI (e.g., the AI chatbot GUI 500) responsive to receipt of a request to a request interact with the AI chatbot. For instance, the server 110 may generate and provide the AI chatbot GUI 500 responsive to a user interaction with the AI chatbot element 350 of the dashboard GUI 300 of FIG. 3.

The electronic processor 200 may receive, via the AI chatbot GUI 500, the user query related to vehicle transportation (at block 1310). As noted herein, a user may provide input, such as, e.g., the user query, into an input portion 510 of the AI chatbot GUI 500. The user query may relate to the TMS platform 112, such as operation of the TMS application 220, the transportation data 155, etc. As one example, the user query may include: "How do I generate a new transportation order?" As another example, the user query may include: "Please source order number T-1234567890." As yet another example, the user query may include: "How many vehicles have we moved for Shipper A this year?" These are merely a few example user queries to help illustrate the method 1300. However, given the underlying LLM(s) and arrangement of the AI system 225 as is illustrated and described herein, the AI system 225 is flexible and the user query may take many other forms, may be presented in languages other than English, and may include inquiries directed to many other features, aspects, and/or data of the system 100.

The electronic processor 200 may provide the user query to the AI system 225 to pre-process the user query to generate a processed user query based on the user query (at block 1315). In some configurations, the AI system 225 may determine (or otherwise generate) intent data related to the user query. Intent data may indicate an intent of the user providing the user query (e.g., what is the user trying to find out by asking the user query) (or an objective of the user query). In some instances, the intent data may indicate (or otherwise) include an intent of the query, an entity of the query, etc. An intent of the query may include (or otherwise relate to), e.g., an order context, a repossession site or location, an order priority (a priority ranking), sourcing data, payout data, retention data, order summary, order status, etc.

In some examples, the AI system 225 may execute an intent classifier LLM (e.g., as one of the LLMs 235) in order to determine an intent of the user query. For example, the AI system 225 may provide the user query to an intent classifier LLM to determine an intent of the user query. In some instances, the intent classifier LLM may receive a prompt asking the intent classifier LLM to determine an intent (or context) of the user query. As one example, when the user query is "Please source T-448873823," the AI system 225 may provide the following prompt to the intent classifier LLM: Provide an intent of the user query "Please source T-448873823." Responsive to the prompt, the intent classifier LLM may determine that the intent of the user query "Please source T-448873823" is sourcing. Based on the user query, the AI system 225 (or the intent classifier LLM) may generate one or more configuration files, such as, e.g., an intent configuration file, a data configuration file, etc. The intent configuration file may include information or data related to a data source or storage location of data relevant to the user query (or an intent of the user query). As one example, the intent configuration file may identify a table in which relevant data may be located. The data configuration file may provide information or data regarding what data or information is accessible for responding to the user query. In some instances, the data configuration file may be based on one or more user permissions associated with a user providing the user query (e.g., the user permissions 160), as described in greater detail herein.

Alternatively, or in addition, in some configurations, the AI system 225 may execute an entity recognition LLM (e.g., as one of the LLMs 235) in order to determine one or more entities of the user query. An entity may include, e.g., an order number, a shipper identification, a transporter identification, an account identifier, an order status, a pick-up location name, a destination name, a pick-up location address, a destination address, etc. In some instances, the entity recognition LLM may receive a prompt asking the entity recognition LLM to determine (or otherwise extract) one or more entities from the user query. Following the example from above, when the user query is "Please source T-448873823," the AI system 225 may provide the following prompt to the entity recognition LLM: Determine an entity of the user query "Please source T-448873823." Responsive to the prompt, the entity recognition LLM may recognize "T-448873823" as an entity, and, in particular, as an order number. In some instances, the entity recognition LLM may classify the entity. Following the previous example, the entity recognition LLM may classify "T-448873823" as an order number. Accordingly, in some configurations, the processed user query may include the user query (as originally received), one or more configuration files (e.g., an intent configuration file, a data configuration file, etc.), data related to one or more entities of the user query (e.g., a portion of the transportation data 155), etc.

Alternatively, or in addition, in some configurations, the processed user query may include user data, such as, e.g., a permission level of a user associated with the user query. In some configurations, the electronic processor 200 (or the AI system 225) may determine a user identifier associated with generation of the user query, where the user identifier may indicate a user who provided the user query. The electronic processor 200 may access user data based on the user identifier. For instance, the user data may include a user permission associated with that user. The user permission may establish or otherwise define what data that user may have access to. In some instances, the processed user query may include the user data, such as, e.g., an indication of the user permission (or permission level) associated with the user query.

Accordingly, in some configurations, the AI system 225 may transform the user query into a processed user query using one or more LLMs 235. For instance, in some examples, the AI system 225 may transform the user query into the processed user query by augmenting (or supplementing) the user query with one or more configuration files, user data, entity data, etc.

The electronic processor 200 may provide the processed user query to the AI system 225 to access, based on the processed user query, the transportation data 155 from the database(s) 115 that stores information related to vehicle transportation (at block 1320). In some configurations, the AI system 225 accesses the transportation data 155 (or a portion thereof) based on the intent of the user query as indicated by the intent data, such as, e.g., the one or more configurations files, the entity data, the user data, etc. For instance, in some configurations, the processed user query may be provided to a query fulfillment LLM (e.g., one or more of the LLMs 235) of the AI system 225 and the query fulfillment LLM may access the transportation data 155 (or a portion thereof) based on the intent of the user query. Accordingly, the transportation data 155 accessed by the AI system 225 (or one or more models thereof) may be related to the intent (or context) of the user query (e.g., as indicated by the one or more configuration files).

In some configurations, the intent of the user query may include a database lookup. For example, the intent of the user query may involve pulling data from the transportation data 155, such as, e.g., a number of orders associated with a particular transporter. In such instances, the AI system 225 (e.g., via the LLM(s) 235 thereof, such as one or more query fulfillment LLMs) may generate, based on the processed user query, a structured query language (SQL) request to query the database(s) 115 for the transportation data 155 (or portion thereof) that is relevant to responding to the user query. The AI system 225 (e.g., one or more query fulfillment LLM(s) thereof) may execute the SQL request against the database(s) 115 and receive, from the database(s) 115, the transportation data 155 (or a portion thereof) based on the SQL request.

Figure 14:
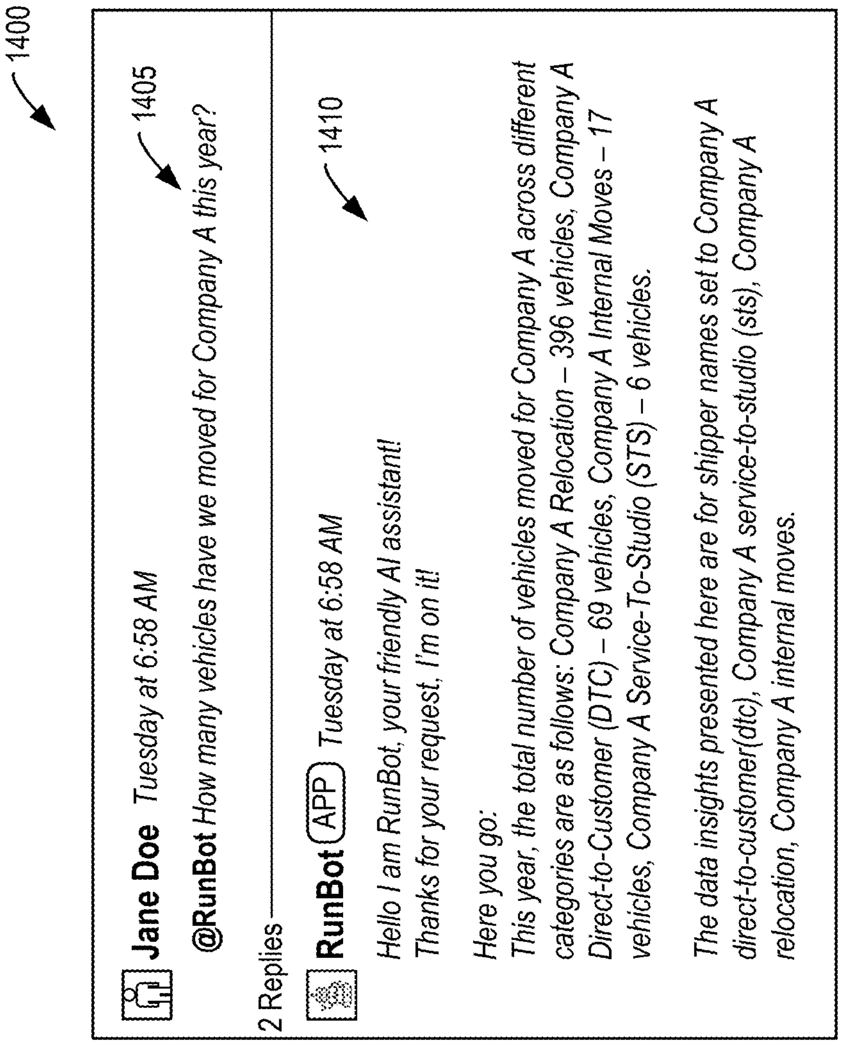
FIG. 14 is a screenshot of a GUI including a user query involving a database lookup in accordance with some configurations.

As one specific example, FIG. 14 is a screenshot of a GUI 1400 including a user query involving a database lookup. As illustrated in FIG. 14, the user query includes: "How many vehicles have we moved for Company A this year?" (represented in FIG. 14 by reference numeral 1405). Responsive to receiving this user query, the AI system 225 (via an intent classifier) may recognize what database tables and entities are involved with answering this user query. The AI system 225 (via an entity classifier) may extract "Company A" (as an entity) and label "Company A" as "shipper". The AI system 225 (e.g., a machine learning model thereof) may map entity to actual shipper names. A SQL constructor of the AI system 225 may create an SQL query to extract involved fields from a specific database table. The SQL constructor may merge the configuration file(s) and the user query to output the SQL query. The SQL constructor of the AI system 225 may also build a filter (or filters) based on shipper name and timeframe. As described in greater detail herein, the AI system 225 (or the electronic processor 200) may output a response to the user query (represented in FIG. 14 by reference numeral 1410).

Alternatively, or in addition, in some configurations, the intent of the user query may include execution of a code function. In some instances, the result of executing the code function may include (or be) the transportation data 155 (or portion thereof) that the AI system 225 accesses. For instance, in some configurations, the AI system 225 may execute a code function based on the processed user query. For example, the processed user query (e.g., the configuration file(s)) may indicate a code function to be executed and data in which the code function is to be executed on (or with respect to). The AI system 225 may generate, based on execution of the code function, the transportation data 155 (or a portion thereof), where the transportation data 155 is a result of executing the code function. In some instances, execution of the code function may include invoking or triggering execution of one or more machine learning models, such as, e.g., one or more of the LLMs 235 (e.g., one or more query fulfillment LLM(s) thereof). Alternatively, or in addition, in some configurations, execution of the code function may include invoking or triggering execution of logic or other instructions in order to generate the transportation data 155 (or portion thereof).

As one specific example, FIG. 15 is a screenshot of a GUI 1500 including a user query involving execution of a code function (or machine learning model). As illustrated in FIG. 15, the user query includes: "Please source T-448873823?" (represented in FIG. 15 by reference numeral 1505). Responsive to receiving this user query, the AI system 225 (via an intent classifier or an intent classifier LLM thereof) may recognize what code functions (or machine learning models) are involved in answering the user query. The AI system 225 (via an entity classifier or an entity classifier or recognition LLM thereof) may extract "T-448873823" and may label "T-448873823" as an order number. In some configurations, the AI system 225 may utilize Python code to execute sourcing code using the order number as input as well as, e.g., transporter order history, transporter order views, transporter location(s), transporter current order(s), transporter future location(s), transporter user interaction with the TMS platform 112 (or app usage), transporter transport vehicle types (or characteristics thereof), etc. As described in greater detail herein, execution of the code may provide an automated action based on the inputted data, and the AI system 225 (or the electronic processor 200) may output a response to the user query based on the execution of the code or a result thereof (represented in FIG. 15 by reference numeral 1510). In the example of FIG. 15, the response may include a ranked list of transporters with supplemental information and web links to do order grouping with maps and additional data.

Alternatively, or in addition, in some configurations, the intent of the user query may include retrieving data from an index, such as, e.g., unstructured data from a document management system. As one example, the intent of the user query may include accessing the electronic content 170 (or a portion thereof). For instance, in some configurations, the AI system 225 (e.g., using one or more of the LLMs 235 thereof) may generate, based on the processed user query, an index request to query the database(s) 115 for unstructured data stored at the database(s) 115. The AI system 225 (or the LLM(s) 235 thereof) may execute the index request against the database(s) 115 and receive from the database(s) 115, the unstructured data as the transportation data 155 (or a portion thereof).

Figure 16:
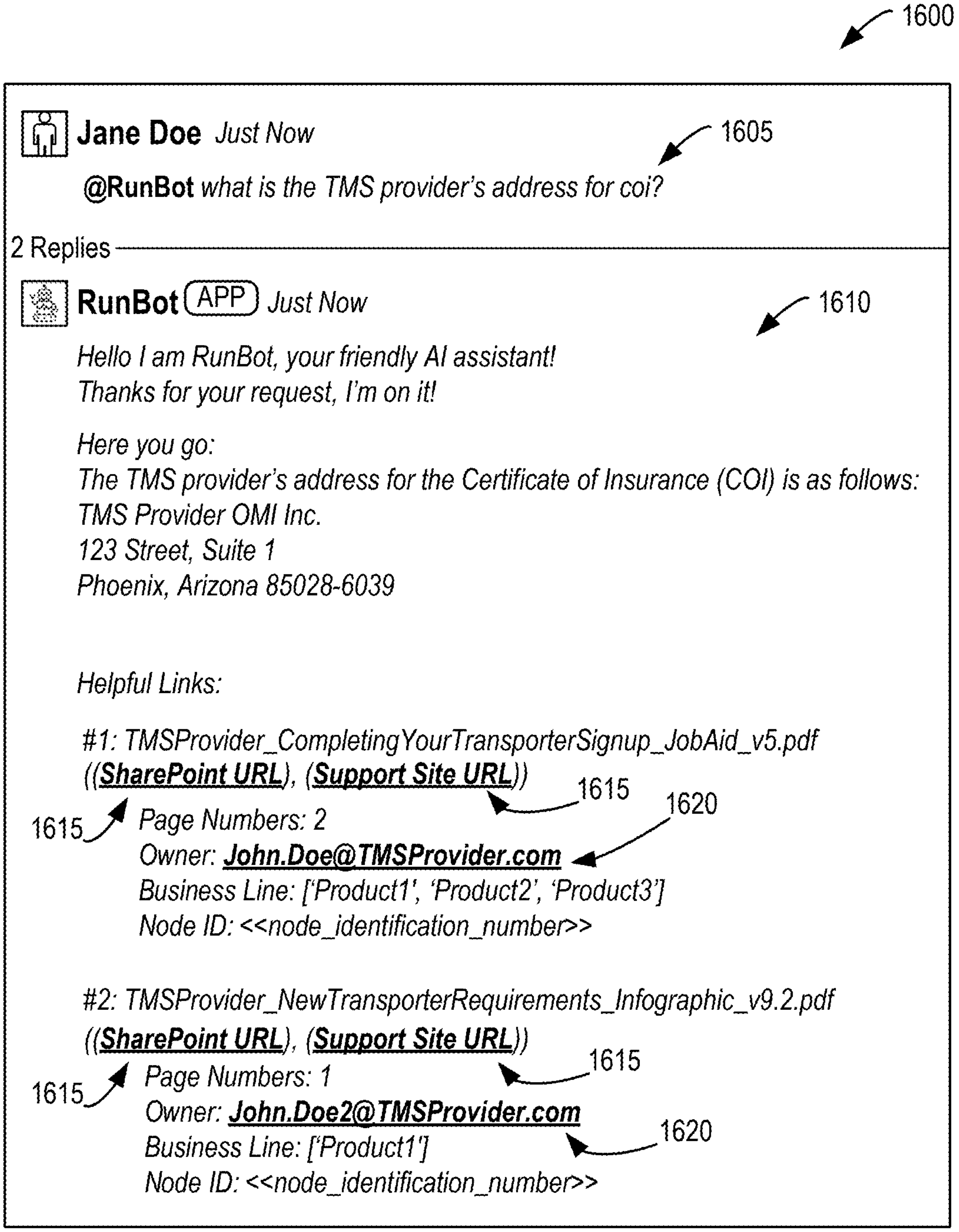
FIG. 16 is a screenshot of a GUI including a user query involving retrieving transportation data from document management system in accordance with some configurations.

As one specific example, FIG. 16 is a screenshot of a GUI 1600 including a user query involving retrieving the transportation data 155 from document management system. As illustrated in FIG. 16, the user query includes: "What is runbuggy's address for COI?" (represented in FIG. 16 by reference numeral 1605). The AI system 225 (e.g., using the LLM(s) 235 thereof) may, based on the user query, access a document management system (e.g., the electronic content 170) using, e.g., Lambda index querying, to access (or otherwise retrieve) the electronic content 170 (or a portion thereof) related to answering the user query. As illustrated in FIG. 16, the AI system 225 (e.g., using the LLM(s) 235 thereof) may output a response to the user query (represented in FIG. 16 by reference numeral 1610), as described in greater detail herein.

Accordingly, the electronic processor 200 may receive, from the AI system 225 (e.g., using the LLM(s) 235 thereof), the transportation data 155 (at block 1325). In some instances, the electronic processor 200 may receive, as the transportation data 155, a result of executing one or more code functions (or machine learning models); data included in a document management system (e.g., the electronic content 170 or a portion thereof), including, in some instances, unstructured data; data stored in the database(s) (e.g., the transporter data 165 or portion thereof), including, in some instances, structured data.

As noted herein, in some instances, a user associated with the generation of the user query may be associated with a permission level establishing which data that user may access and which data that user may not access (e.g., the user permission(s) 160). Accordingly, in some instances, the AI system 225 may access the transportation data 155 pursuant to the user permission(s) 160 of the user generating the user query. As such, in some configurations, the electronic processor 200 may receive, from the AI system 225, transportation data 155 that includes data in which the user associated with generation of the user query is permitted to access (as established by the permission level or user permission(s) 160 of that user).

The electronic processor 200 may provide the transportation data 155 and the user query to the AI system 225 to determine an automated answer to the user query based on the transportation data 155 (at block 1330). For instance, in some configurations, after receiving the transportation data 155 related to answering the user query, the electronic processor 200 may provide the transportation data 155 and the user query to the AI system 225 (or the LLM(s) 235 thereof). Responsive to receipt of the transportation data 155 and the user query, the AI system 225 (or the LLM(s) 235 thereof) may determine an automated answer to the user query based on the transportation data 155. In some configurations, the AI system 225 may utilize one or more of the LLMs 235 to determine the automated answer to the user query based on the transportation data 155. For instance, in some examples, the electronic processor 200 (or the AI system 225) may provide a prompt to the LLM(s) 235. The prompt may request the LLM(s) 235 to respond to the user query using the transportation data 155. As one specific example, with reference to FIG. 14, when the user query is "How many vehicles have we moved for Company A this year?" and the transportation data 155 includes information related to previous orders for Company A this year, the prompt provided to the LLM(s) 235 may request the LLM(s) 235 to determine how many vehicles were moved for Company A this year based on the transportation data 155 (e.g., the information related to previous orders for Company A this year), where the LLM(s) 235 have access to the information related to previous orders for Company A this year (e.g., the transportation data 155). Based on the prompt, the LLM(s) 235 may determine the automated answer to the user query. Following the previous example, the LLM(s) 235 may determine how many vehicles were moved for Company A this year (as the automated answer to the user query). Accordingly, in some examples, the electronic processor 200 may receive, from the AI system 225 (e.g., the LLM(s) 235 thereof), the automated answer to the user query (at block 1335).

In some configurations, the electronic processor 200 may determine a validity of the automated answer with respect to the user query. In some instances, the electronic processor 200 may provide the user query and the automated answer to the AI system 225 (e.g., the LLM(s) 235 thereof) to determine a validity of the automated answer with respect to the user query. For example, the electronic processor 200 may transmit or generate a prompt to the LLM(s) 235 asking the LLM(s) 235 to indicate whether the automated answer is a valid or invalid answer to the user query. When the electronic processor 200 (or the AI system 225 via, e.g., the LLM(s) 235) determines that the automated answer is a valid answer to the user query, the electronic processor 200 may proceed with transforming the automated answer into a human readable format as a response to the user query, as described herein (e.g., with respect to block 1340 of FIG. 13). When the electronic processor 200 (or the AI system 225 via, e.g., the LLM(s) 235) determines that the automated answer is not a valid answer (e.g., is an invalid answer) to the user query, the electronic processor 200 may determine a recommended user query based on the intent (or context) of the user query. The recommended user query may remediate the invalidity of the automated answer. As one example, when the user query is related to (or has an intent or context related to) sourcing a vehicle transportation order but does not include an order number of the vehicle transportation order, the recommended user query may suggest or recommend including an order number when inquiring about sourcing a vehicle transportation order. In some configurations, the electronic processor 200 may transmit (or otherwise provide) the recommended user query to a user (e.g., the shipper(s) 130, the transporter(s) 120, the TMS users, etc.) such that the recommended user query is displayed via a user interface (e.g., one or more of the GUIs described herein).

In some configurations, the automated answer may be difficult for a human user to interpret, such as, e.g., due to the complexity, the formatting, the size or amount of data included in the automated answer, etc. Accordingly, in some configurations, the electronic processor 200 may transform the automated answer to the user query into a human readable format as a response to the user query (at block 1340). For example, the electronic processor 200 may transmit or generate a prompt with the automated answer to the LLM(s) 235 requesting that the LLM(s) 235 transform the automated answer to the user query into a human readable format. In some instances, the electronic processor 200 may implement the AI system 225 (e.g., the LLM(s) 235) to transform the automated answer into a human readable format (i.e., the response to the user query). In some instances, the automated answer may be re-formatted or otherwise transformed such that the automated answer is more easily understood and interpreted by a human user. For instance, in some instances, the automated answer may be converted into a graphical representation, such as, e.g., a table representing the automated answer (or the response). In some instances, the automated answer may be transformed into a downloadable electronic file that includes (or otherwise represents the automated answer), such as, e.g., a CVS file. As yet another example, in some instances, the automated answer may be transformed into one or more complete sentences. As still another example, in some instances, the automated answer may be associated with an interactive link to a data source (e.g., the electronic content 170) in which the automated answer is related to (or included in).

The electronic processor 200 may update the user interface to include the response to the user query as an updated user interface (at block 1345). In some configurations, the electronic processor 200 may update the user interface by including an interactive link. In some examples, the interactive link may be a link to an electronic content (e.g., the electronic content 170). Responsive to a user interaction with the interactive link, the electronic processor 200 may facilitate access to the electronic content 170 associated with the response to the user query. For instance, the electronic processor 200 may transmit the electronic content 170 for display. As one example, with reference to FIG. 16, the response 1610 to the user query includes one or more interactive links 1615 to documents (e.g., the electronic content 170) that are related to the response to the user query. When a user interacts with those interactive links 1615, the user may be presented with (or otherwise be able to access and interact with) the documents (e.g., the electronic content 170) related to the response to the user query. Alternatively, or in addition, in some instances, the interactive link may include a link that, when interacted with, initiates communication with a particular user or entity. In the example of FIG. 16, the response 1610 may include one or more email links 1620 for contacting a user related to the response to the user query. Alternatively, or in addition, in some instances, the interactive link may provide access to a downloadable electronic file that includes (or otherwise represents the automated answer), such as, e.g., a CVS file.

In some configurations, the technology disclosed herein may repeat (or loop) through one or more portions (or steps) of the methods described herein. As one example, in some instances, in order to determine a response to a user query, the electronic processor 200 may need to determine a first automated answer to the user query in order to determine a second automated answer that is based on the first automated answer, where the second automated answer is the response provided to the user query.

For instance, in some configurations, the electronic processor 200 may provide the transportation data, a first automated answer, the user query, or a combination thereof to the AI system 225 such that the AI system 225 may determine (or otherwise generate) a subsequent automated answer to the user query based on the one or more of the transportation data 155, the first automated answer, or the user query. The electronic processor 200 may receive, from the AI system 225, the subsequent automated answer to the user query. In such instances, the response to the user query may be based on the automated answer, the subsequent automated answer, or a combination thereof.

Figure 17:
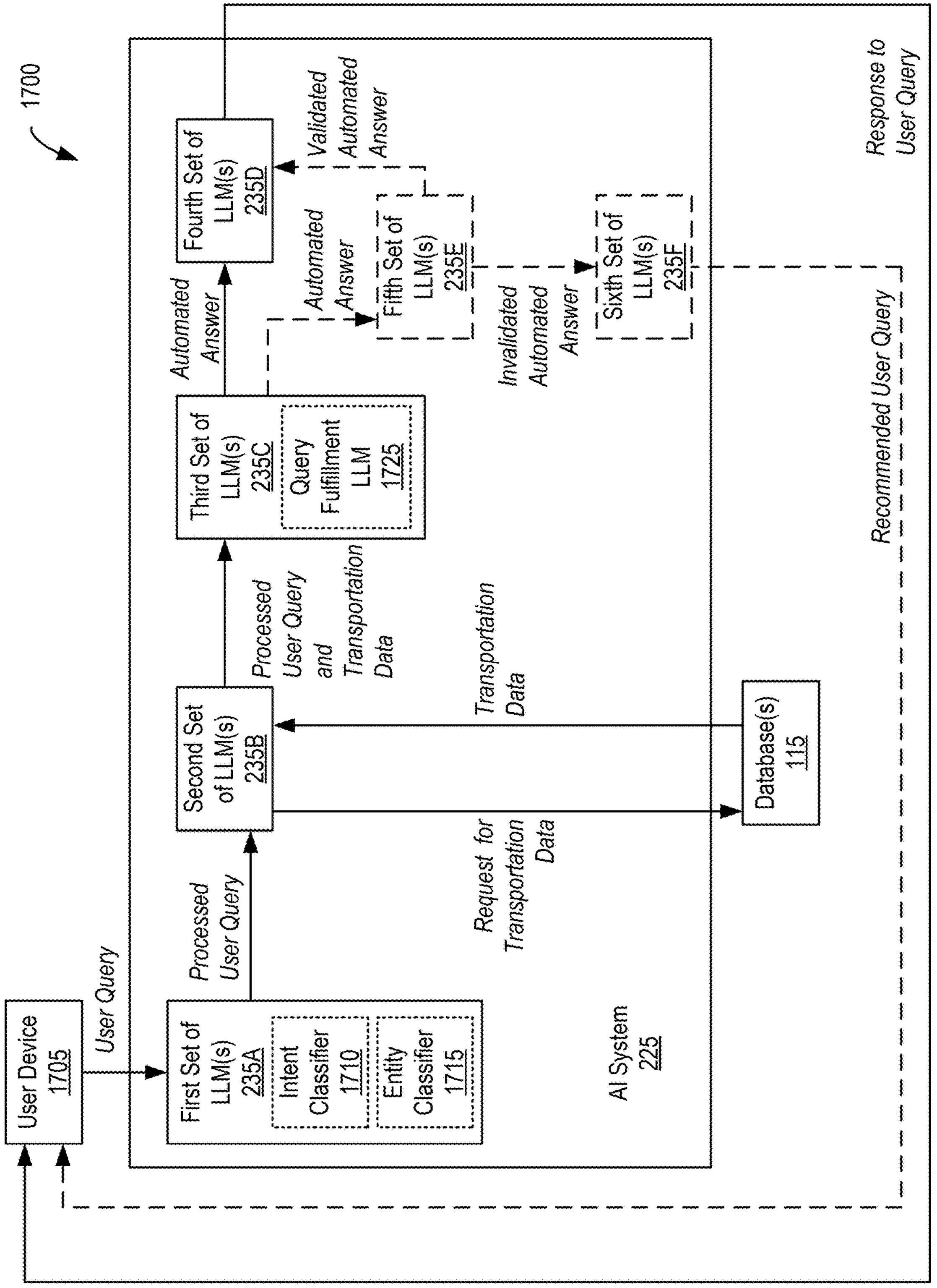
FIG. 17 is a schematic diagram of an example architecture of a TMS platform, including an artificial intelligence system, in accordance with some configurations.

FIG. 17 is a schematic diagram of an example architecture 1700 of the AI system 225 in accordance with some configurations. The example architecture 1700 may be utilized by (or as part of) the systems and methods described herein, including, e.g., the system 100, the method 600, or the method 1300.

As illustrated in FIG. 17, a user device 1705 (e.g., the TMS user device(s) 117, the shipper user device(s) 132, the transport user device(s) 122, etc.) may provide a user query to a first set of LLM(s) 235A (e.g., as similarly described herein, such as, e.g., with respect to blocks 1305 or 1310 of FIG. 13). The first set of LLM(s) 235A may preprocess the user query to generate the processed user query based on the user query (e.g., as similarly described herein, such as, e.g., with respect to blocks 1315 or 1320 of FIG. 13). As illustrated in FIG. 17, the first set of LLM(s) 235A may include, e.g., an intent classifier 1710 (e.g., as similarly described herein, such as, e.g., with respect to the intent classifier or the intent classifier LLM), an entity classifier 1715 (e.g., as similarly described herein, such as, e.g., with respect to the entity recognition model or the entity classifier), or a combination thereof. The first set of LLM(s) 235A may provide the processed user query to a second set of LLM(s) 235B (e.g., as similarly described herein, such as, e.g., with respect to blocks 1315 or 1320 of FIG. 13). The second set of LLM(s) 235B may access, based on the processed query, transportation data from the database(s) 115 (e.g., as similarly described herein, such as, e.g., with respect to blocks 1320 and 1325 of FIG. 13). The second set of LLM(s) 235B may provide the processed user query and the transportation data to a third set of LLM(s) 235C (e.g., as similarly described herein, such as, e.g., with respect to blocks 1325 or 13030). In some examples, the third set of LLM(s) 235C may include a query fulfillment LLM 1725 (e.g., as similarly described herein, such as, e.g., with respect to the query fulfillment model or LLM). The third set of LLM(s) 235C may determine, based on the processed user query or the transportation data, an automated answer to the user query (e.g., as similarly described herein, such as, e.g., with respect to blocks 1330 or 1335 of FIG. 13). The third set of LLM(s) 235C may provide the automated answer to a fourth set of LLM(s) 235D (e.g., as similarly described herein, such as, e.g., with respect to blocks 1335 or 1340 of FIG. 13). The fourth set of LLM(s) 235D may transform the automated answer to the user query into a human readable format as a response to the user query (e.g., as similarly described herein, such as, e.g., with respect to block 1340 of FIG. 13). The fourth set of LLM(s) 235D may output (or otherwise provide) the response to the user query, such that the response to the user query may be provided within a user interface displayed at the user device 1705 (e.g., as similarly described herein, such as, e.g., with respect to block 1345 of FIG. 13.

Alternatively, or in addition, in some configurations, the third set of LLM(s) 235° C. may provide the automated answer to a fifth set of LLM(s) 235E (e.g., as similarly described herein, such as, e.g., with respect to the data validation process) (as opposed to providing the automated answer directly to the fourth set of LLM(s) 235D, as noted above). The fifth set of LLM(s) 235E may determine whether the automated answer is a valid answer to the user query (e.g., as similarly described herein). When the automated answer is a valid answer to the user query (e.g., as described in greater detail herein), the fifth set of LLM(s) 235E may provide the validated automated answer to the fourth set of LLM(s) 235D. When the automated answer is an invalid answer to the user query (e.g., as described in greater detail herein), the fifth set of LLM(s) 235E may provide the invalidated automated answer to a sixth set of LLM(s) 235F. The sixth set of LLM(s) 235F may determine a recommended user query and provide the recommended user query for display to a user of the user device 1705, as described in greater detail herein.

Other examples and uses of the disclosed technology will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

What is claimed is:

1. An electronic transportation management system, the system comprising:

a processing system comprising one or more electronic processors, the processing system configured to:

generate a user interface to receive a user query related to vehicle transportation;

receive, via the user interface, the user query related to vehicle transportation;

provide the user query to an artificial intelligence (AI) system including one or more machine learning models, the AI system to pre-process the user query to generate a processed user query based on the user query;

provide the processed user query to the AI system, wherein the AI system is to access, based on the processed user query, transportation data from a database that stores information related to vehicle transportation;

receive, from the AI system, the transportation data;

provide the transportation data and the user query to the AI system, wherein the AI system is to determine an automated answer to the user query based on the transportation data;

receive, from the AI system, the automated answer to the user query;

provide, with the processing system, the user query and the automated answer to a large language model (LLM) of the AI system to determine a validity of the automated answer with respect to the user query;

responsive to the LLM determining that the automated answer is a valid answer to the user query:

transform the automated answer to the user query into a human readable format as a response to the user query;

update the user interface to include the response to the user query as an updated user interface; and transmit the updated user interface to a user device for display using the user interface.

2. The system of claim 1, wherein, responsive to receive of the user query, the AI system is configured to generate a configuration file based on the user query, wherein the processed user query includes the user query and the configuration file.

3. The system of claim 2, wherein the configuration file is based on an intent of the user query and an entity of the user query, and wherein the configuration file is indicative of a storage location of the transportation data.

4. The system of claim 2, wherein, responsive to receipt of the processed user query, the AI system is configured to access the transportation data based on the configuration file and the user query.

5. The system of claim 1, wherein, responsive to receipt of the processed user query, the AI system is configured to access the transportation data by:

generating, based on the processed user query, a structured query language (SQL) request to query the database for the transportation data;

executing the SQL request against the database; and receiving, from the database, the transportation data.

6. The system of claim 5, wherein the AI system is configured to determine the automated answer using the transportation data.

7. The system of claim 1, wherein, responsive to receipt of the processed user query, the AI system is configured to access the transportation data by:

executing a code function based on the processed user query; and generating, based on execution of the code function, the transportation data, wherein the transportation data is a result of executing the code function, wherein the AI system is to determine the automated answer to the user query based on the transportation data resulting from execution of the code function.

8. The system of claim 1, wherein, responsive to receipt of the processed user query, the AI system is configured to access the transportation data by:

generating, based on the processed user query, an index request to query the database for unstructured data stored at the database;

executing the index request against the database; and receiving, from the database, the unstructured data as the transportation data, wherein the AI system is to determine the automated answer to the user query based on the unstructured data as the transportation data.

9. The system of claim 8, wherein the database is a document management system and the unstructured data is electronic content stored within the document management system, and wherein the electronic content relates to the user query.

10. A method to control artificial intelligence (AI) human-machine interaction within a transportation management system, the method comprising:

generating, with a processing system comprising one or more electronic processors, a user interface to receive a user query related to vehicle transportation;

receiving, with the processing system, via the user interface, the user query related to vehicle transportation;

providing, with the processing system, the user query to an artificial intelligence (AI) system including one or more machine learning models, the AI system to pre-process the user query to transform the user query to a processed user query, wherein the processed user query is the user query augmented with a configuration file that is indicative of an intent of the user query and an entity of the user query;

receiving, with the processing system, from the AI system, the processed user query;

providing, with the processing system, the processed user query to the AI system, wherein the AI system is to access, based on the processed user query, transportation data from a database that stores information related to vehicle transportation, wherein the transportation data is related to the intent of the user query as indicated by the configuration file;

receiving, with the processing system, from the AI system, the transportation data;

providing, with the processing system, the transportation data and the user query to the AI system, wherein the AI system is to determine an automated answer to the user query based on the transportation data;

receiving, with the processing system, from the AI system, the automated answer to the user query;

providing, with the processing system, the user query and the automated answer to a large language model (LLM) of the AI system to determine a validity of the automated answer with respect to the user query;

responsive to the LLM determining that the automated answer is an invalid answer to the user query:

providing, with the processing system, the user query to the AI system to determine a recommended user query based on an intent of the user query, wherein the recommended user query is to remediate a cause of the automated answer being an invalid answer to the user query; and transmitting, with the processing system, the recommended user query to a user device for display via the user interface;

receiving, with the processing system, a second automated answer for the recommended user query;

transforming, with the processing system, the second automated answer for the recommended user query into a human readable format as a response to the recommended user query;

updating, with the processing system, the user interface to include the response to the recommended user query as an updated user interface; and transmitting, with the processing system, the updated user interface to the user device for display using the user interface.

11. The method of claim 10, further comprising:

prior to transforming, with the processing system, the second automated answer for the recommended user query into the human readable format as the response to the recommended user query:

providing, with the processing system, the recommended user query and the second automated answer to the large language model (LLM) of the AI system to determine a validity of the second automated answer with respect to the recommended user query, and wherein transforming, with the processing system, the second automated answer for the recommended user query into the human readable format as the response to the recommended user query includes transforming, with the processing system, the second automated answer for the recommended user query into the human readable format as the response to the user query responsive to the LLM determining that the second automated answer is a valid answer to the recommended user query.

12. The method of claim 10, further comprising:

determining, with the processing system, based on the user query, a user identifier related to generation of the user query; and determining, with the processing system, a permission level associated with the user identifier, and wherein the AI system is configured to access the transportation data in accordance with the permission level associated with the user identifier, wherein the transportation data includes data that a user associated with the user identifier is permitted to access as established by the permission level.

13. The method of claim 10, wherein updating, with the processing system, the user interface to include the response to the user query as the updated user interface includes:

updating, with the processing system, the user interface to include an interactive link to an electronic content related to the transportation data, wherein the electronic content is a source of the transportation data, wherein, responsive to a user interaction with the interactive link, the processing system is configured to transmit the electronic content to the user device for display.

14. The method of claim 10, further comprising:

providing, with the processing system, the transportation data, the automated answer and the user query to the AI system, wherein the AI system is to determine a subsequent automated answer to the user query based on the automated answer and the user query; and receiving, with the processing system, from the AI system, the subsequent automated answer to the user query, and wherein transforming, with the processing system, the automated answer to the user query into the human readable format as the response to the user query includes transforming, with the processing system, the subsequent automated answer to the user query into the human readable format as the response to the user query such that the response to the user query includes the subsequent automated answer.

15. A non-transitory computer-readable medium storing instructions that, when executed by one or more electronic processors of a processing system, cause the processing system to perform operations comprising:

generating a user interface to receive a user query related to vehicle transportation;

receiving, via the user interface, the user query related to vehicle transportation;

providing the user query to an artificial intelligence (AI) system including one or more machine learning models, the AI system to generate an automated response to the user query based on transportation data that is accessible from a database and is relevant to answering the user query;

providing, with the processing system, the user query and the automated response to a large language model (LLM) of the AI system to determine a validity of the automated response with respect to the user query;

responsive to the LLM determining that the automated response is an invalid response to the user query:

providing the user query to the AI system to determine a recommended user query based on an intent of the user query, wherein the recommended user query is to remediate a cause of the automated response being an invalid response to the user query; and transmitting the recommended user query to a user device for display via the user interface.

16. The computer-readable medium of claim 15, further comprising:

receiving a second automated response for the recommended user query;

updating the user interface to include a response to the user query that represents the second automated response to the user query as determined by the AI system; and transmitting the updated user interface to the user device for display using the user interface wherein updating the user interface to include the response to the user query includes updating the user interface to include a response to the user query that represents the second automated response that is based on a result of executing a code function.

17. The computer-readable medium of claim 16, wherein updating the user interface to include the response to the user query includes updating the user interface to include a response to the user query that represents the second automated response that is determined based on execution of a request to query the database for the transportation data, and wherein the second automated response is based on the transportation data retrieved from the database based on execution of a request to query the database for the transportation data.

18. The computer-readable medium of claim 15, wherein the transportation data is based on at least two of:

execution of a structured query language (SQL) request against the database;

execution of a code function, wherein the transportation data is a result of executing a code function; or execution of an index request against the database, wherein the database includes a document management system that stores unstructured data and the transportation data is included in the unstructured data stored in the document management system.

19. The computer-readable medium of claim 16, wherein updating the user interface to include the response to the user query as the updated user interface includes updating the user interface to include at least one of:

a first interactive link to an electronic content related to the transportation data, wherein the electronic content is a source of the transportation data, and wherein, responsive to a first user interaction with the first interactive link, the electronic content is provided to the user device for display;

a graphical representation of the response to the user query; or a second interactive link to the response to the user query, wherein, responsive to a first user interaction with the second interactive link, the response is provided to the user device to be downloaded and stored locally at the user device.

* * * * *